US012162015B2

(12) United States Patent
Handique et al.

(10) Patent No.: US 12,162,015 B2
(45) Date of Patent: Dec. 10, 2024

(54) SYSTEM AND METHOD FOR TARGET DETECTION WITH APPLICATIONS IN CHARACTERIZING FOOD QUALITY AND IMPROVING FOOD SAFETY

(71) Applicants: Bio-Rad Europe GmbH, Basel (CH); Bio-Rad Laboratories, Inc., Hercules, CA (US)

(72) Inventors: Kalyan Handique, Ann Arbor, MI (US); Ronald Lebofsky, Richmond, CA (US); Emilie Celine Claudie Macke, Caestre (FR); Rebecca Dievart, Armentieres (FR); Christophe Quiring, Hazebrouck (FR); Sophie Pierre, Chatou (FR)

(73) Assignees: Bio-Rad Laboratories, Inc., Hercules, CA (US); Bio-Rad Europe GmbH, Basel (CH)

( * ) Notice: Subject to any disclaimer, the term of this patent is extended or adjusted under 35 U.S.C. 154(b) by 344 days.

(21) Appl. No.: 17/499,454

(22) Filed: Oct. 12, 2021

(65) Prior Publication Data

US 2022/0111380 A1 Apr. 14, 2022

Related U.S. Application Data

(60) Provisional application No. 63/091,101, filed on Oct. 13, 2020.

(51) Int. Cl.
*B01L 3/00* (2006.01)

(52) U.S. Cl.
CPC ....... *B01L 3/50855* (2013.01); *B01L 3/50853* (2013.01); *B01L 2200/0684* (2013.01); (Continued)

(58) Field of Classification Search
CPC ............... B01L 3/5085; B01L 3/50853; B01L 3/50855; B01L 2300/123; B01L 2300/0829; C12M 23/12
See application file for complete search history.

(56) References Cited

U.S. PATENT DOCUMENTS 3,787,290 A * 1/1974 Kaye .................. B01L 3/50853 435/40
5,965,452 A 10/1999 Kovacs
(Continued)

FOREIGN PATENT DOCUMENTS

DE 2351617 A1 4/1975
JP 2001522242 A 11/2001
(Continued)

*Primary Examiner* — Jill A Warden
*Assistant Examiner* — Dwayne K Handy
(74) *Attorney, Agent, or Firm* — Jeffrey Schox

(57) ABSTRACT

A system, method, and platform for target detection, the system including: a base substrate; a set of sample processing regions defined at a broad surface of the substrate, wherein each of the set of sample processing regions includes: a set of microwell subarrays arranged in a gradient between an upstream end and a downstream end of each respective sample processing region, and a boundary separating each respective sample processing region from adjacent sample processing regions; and a cover substrate configured to mate with the base substrate in a coupled mode, the cover substrate comprising a network of venting channels aligned with the set of sample processing regions upon mating the base substrate with the cover substrate in the coupled mode, the network of venting channels providing gas exchange between the base substrate and an environment surrounding the microwell assembly. The invention(s) can be used for MPN assays.

18 Claims, 12 Drawing Sheets

(52) U.S. Cl.
CPC ... *B01L 2300/042* (2013.01); *B01L 2300/069* (2013.01); *B01L 2300/123* (2013.01); *B01L 2300/14* (2013.01)

(56) References Cited

U.S. PATENT DOCUMENTS

| | | | |
|---|---|---|---|
| 6,429,027 | B1 | 8/2002 | Chee et al. |
| 6,485,690 | B1 * | 11/2002 | Pfost .................... B01L 3/5025 422/68.1 |
| 6,585,939 | B1 * | 7/2003 | Dapprich .......... B01L 3/502707 435/287.8 |
| 6,723,290 | B1 | 4/2004 | Wardlaw |
| 6,828,100 | B1 | 12/2004 | Ronaghi |
| 7,731,901 | B2 | 6/2010 | Wardlaw |
| 7,781,185 | B2 | 8/2010 | Goldman et al. |
| 8,029,745 | B2 | 10/2011 | Hunter et al. |
| 8,420,017 | B2 | 4/2013 | Jones et al. |
| 8,846,415 | B2 | 9/2014 | Duffy et al. |
| 9,463,431 | B2 | 10/2016 | Love et al. |
| 9,482,662 | B2 | 11/2016 | Duffy et al. |
| 9,809,838 | B2 | 11/2017 | Walt et al. |
| 9,850,123 | B2 | 12/2017 | Gu et al. |
| 9,885,701 | B2 | 2/2018 | Xie et al. |
| 10,865,434 | B2 | 12/2020 | Hallock et al. |
| 10,941,396 | B2 | 3/2021 | Fu et al. |
| 11,547,995 | B2 | 1/2023 | Handique et al. |
| 2001/0024805 | A1 | 9/2001 | Williams et al. |
| 2008/0305515 | A1 | 12/2008 | Burgart et al. |
| 2009/0298116 | A1 | 12/2009 | Fang et al. |
| 2010/0216228 | A1 | 8/2010 | Love et al. |
| 2010/0301398 | A1 | 12/2010 | Rothberg et al. |
| 2011/0003286 | A1 | 1/2011 | Hanafusa et al. |
| 2012/0129208 | A1 | 5/2012 | Khine et al. |
| 2014/0287423 | A1 | 9/2014 | Nurse |
| 2016/0016169 | A1 | 1/2016 | Ben-Yakar et al. |
| 2016/0053293 | A1 * | 2/2016 | Broder .................... C12Q 1/04 435/305.3 |
| 2016/0175836 | A1 | 6/2016 | Taylor et al. |
| 2016/0256870 | A1 | 9/2016 | Ismagilov et al. |
| 2018/0002764 | A1 | 1/2018 | Fan et al. |
| 2018/0250672 | A1 | 9/2018 | Jamshidi et al. |
| 2019/0085371 | A1 | 3/2019 | Broder et al. |
| 2019/0086324 | A1 | 3/2019 | Marrinucci et al. |
| 2019/0111424 | A1 | 4/2019 | Chou et al. |
| 2019/0143328 | A1 | 5/2019 | Savran et al. |
| 2019/0218497 | A1 | 7/2019 | Boedicker et al. |
| 2020/0095526 | A1 | 3/2020 | Rothbauer et al. |

FOREIGN PATENT DOCUMENTS

| | | | |
|---|---|---|---|
| JP | 2007166979 | A | 7/2007 |
| JP | 2012518411 | A | 8/2012 |
| JP | 2017526362 | A | 9/2017 |
| JP | 2019522176 | A | 8/2019 |
| WO | 9845406 | A1 | 10/1998 |
| WO | 2008096492 | A1 | 8/2008 |
| WO | 2010096652 | A1 | 8/2010 |
| WO | 2016032824 | A1 | 3/2016 |

* cited by examiner

CROSS-SECTIONAL VIEW

CROSS-SECTIONAL VIEW

SYSTEM AND METHOD FOR TARGET DETECTION WITH APPLICATIONS IN CHARACTERIZING FOOD QUALITY AND IMPROVING FOOD SAFETY

CROSS-REFERENCE TO RELATED APPLICATIONS

This application claims the benefit of U.S. Provisional Application No. 63/091,101 filed on 13 Oct. 2020, which is incorporated in its entirety herein by this reference.

TECHNICAL FIELD

This invention relates generally to the food safety field, and more specifically to new and useful systems and methods for target detection, with applications in characterizing food quality and improving food safety.

BACKGROUND

Identifying and/or quantifying microorganisms is relevant to many fields, including fields related to quality and safety of consumables (e.g., foods, drinks, supplements, topical consumables, etc.). Culturing samples of such consumables in order to detect presence or absence of microorganisms is typically time consuming, manual, and subject to cost constraints, motivating development of new technologies to address these and other deficiencies.

The food industry is subject to a plenitude of requirements for monitoring of numerous parameters of food safety and hygiene parameters, including, with respect to contaminants, pathogens, and quality indicators, across various stages from raw material production, procurement and handling, to manufacturing, distribution and consumption of the finished food product. One aspect of these requirements involves enumeration of microbial food quality indicators (QI). Such QI characterization provides indication about product quality (e.g., in relation to spoilage, in relation to shelf life) and process hygiene, and helps predicting the occurrence of pathogenic organisms. Several methods exist for the enumeration of QI in food and environmental samples, the most widely used being colony counting (e.g., implementing agar medium, implementing ready-to-use pads containing dehydrated reagents, etc.) and most probable number (MPN) techniques; however, such techniques can be prone to one or more of: human error, inherent assay variability, low technical reproducibility, lengthy time to results, lack of automation, inhibition associated with detection, limited counting ranges, low sensitivity, analogue as opposed to digital readouts, high cost, high degree of waste, complex workflows, low throughput and food matrix incompatibility, Moreover, such techniques can require specialized reagents for enumeration and characterization of different target microorganisms.

In the clinical setting, pathogenic microorganisms can exhibit varying degrees of susceptibility to antimicrobial agents. Thus clinicians often benefit from identifying both the species or strain of pathogen and its susceptibility to various classes of antimicrobials and combinations thereof. However, methods for clinical assessment of microbial infections that are used in the art typically require at least 16-48 hours to determine antimicrobial susceptibility and are subject to similar deficiencies to those described above.

As such, there is a need for new and useful systems and methods for target detection, with applications in characterizing food quality and improving food safety

DESCRIPTION OF THE PREFERRED EMBODIMENTS

Figure 1A:
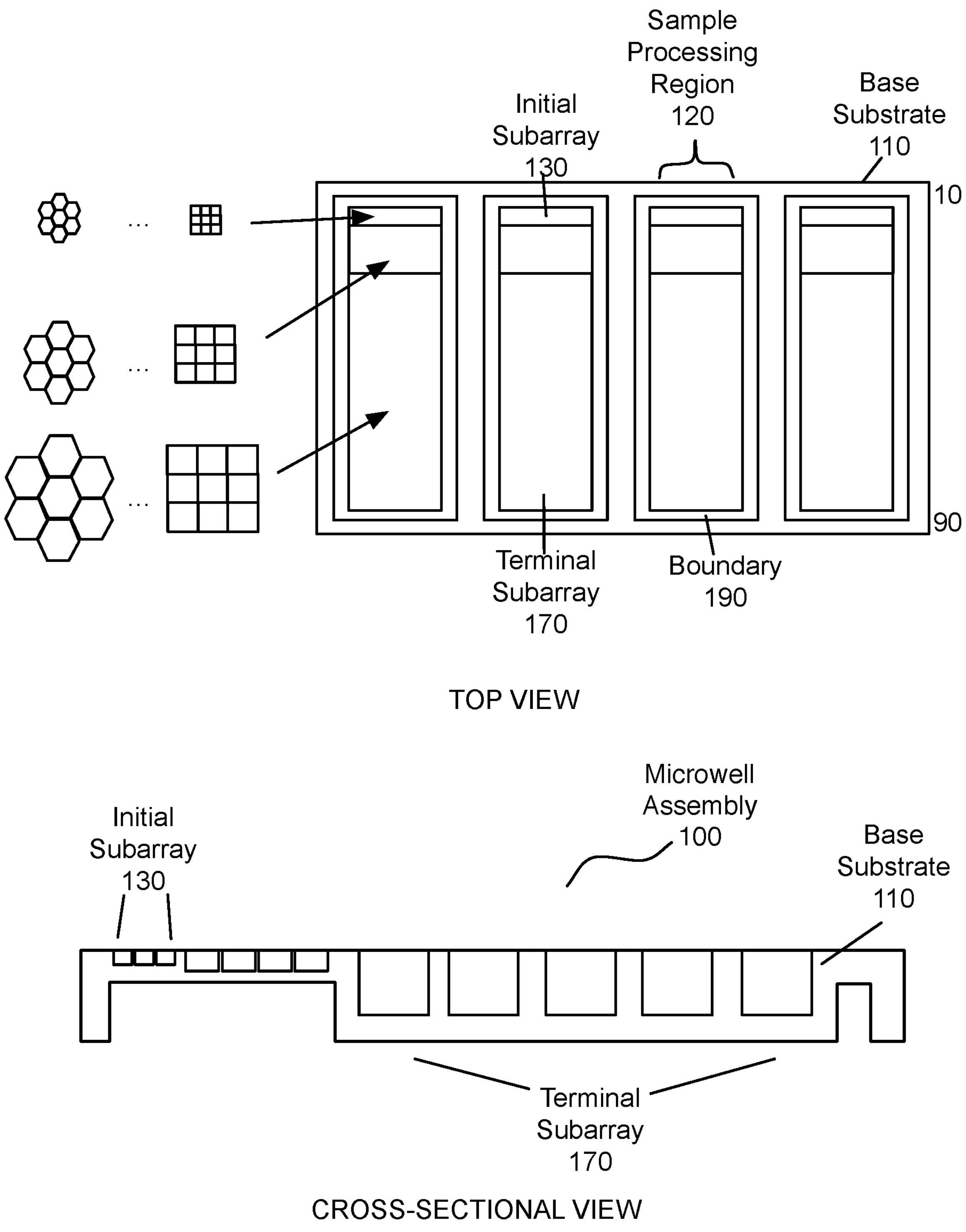
FIGS. 1A-1B depict schematic representations of embodiments of a microwell assembly for target detection.

The following description of the preferred embodiments of the invention is not intended to limit the invention to these preferred embodiments, but rather to enable any person skilled in the art to make and use this invention.

1. BENEFITS

The invention(s) can confer several benefits over conventional systems and methods.

In particular, the invention(s) confer(s) the benefit of providing innovative solutions for target detection assays involving sample partitioning (e.g., for MPN assays) in a streamlined, efficient, and/or automatic manner, with respect to minimizing manual steps associated with partitioning. The invention(s) also include innovative designs of sample processing disposables, such that multiple samples can be processed in parallel in a high-throughput manner that is not costoprohibitive in various industries. Such designs optionally include structures and features that function to provide automated sample application and distribution, controlled liquid spreading, controlled sample containment, variable volume sample partitioning, humidity control, evaporation prevention, and/or cross-talk prevention, as described in more detail below.

The invention(s) also confer(s) the benefit of providing systems and methods for target detection in a manner that significantly reduces human error, complexity of workflows, inherent assay variability, and duration of time needed for characterization and enumeration of targets.

The invention(s) also confer(s) the benefit of automating and/or simplifying processing steps, and in some variations, can automatically partition samples (e.g., samples less than or equal to 1 mL in volume, samples greater than 1 mL in volume) for MPN assays. By processing small volumes efficiently, the invention(s) can also significantly reduce waste associated with assay operation, optimize run success, and optimize consistency across runs and/or across different users.

In examples, the invention(s) also confer(s) the benefit of implementing small volumes to significantly reduce the time required for a converted enzymatic substrate, such as a chromogenic substrate, to reach detection thresholds, thereby significantly reducing the time to result and turnaround time. Dividing the sample into small partitions in a rapid manner also increases the counting range and improves the accuracy of MPN estimations.

The invention(s) also confer(s) the benefit of mitigating inhibition issues associated with the generation of a converted enzymatic substrate and/or detection by colorimetric and/or fluorescent (e.g., multi-channel fluorescent) methods.

Variations of the invention(s) also confer(s) the benefit of providing structures and environments for growing microorganisms, as well as providing kits, compositions, methods, and apparatuses for rapidly analyzing microorganism growth and/or number in a cost-efficient and time-efficient manner.

Additionally, the invention(s) can provide a closed system for microorganism growth and detection, preventing laboratory contamination with potentially harmful pathogens.

Additionally, through software and workflow improvements, the system and/or method can minimize number of manual operations performed by a user, and provide relevant system status reports to ensure smooth operation and sample processing.

Additionally or alternatively, the system and/or method can confer any other suitable benefit.

2. MICROWELL PLATE

Figure 1B:
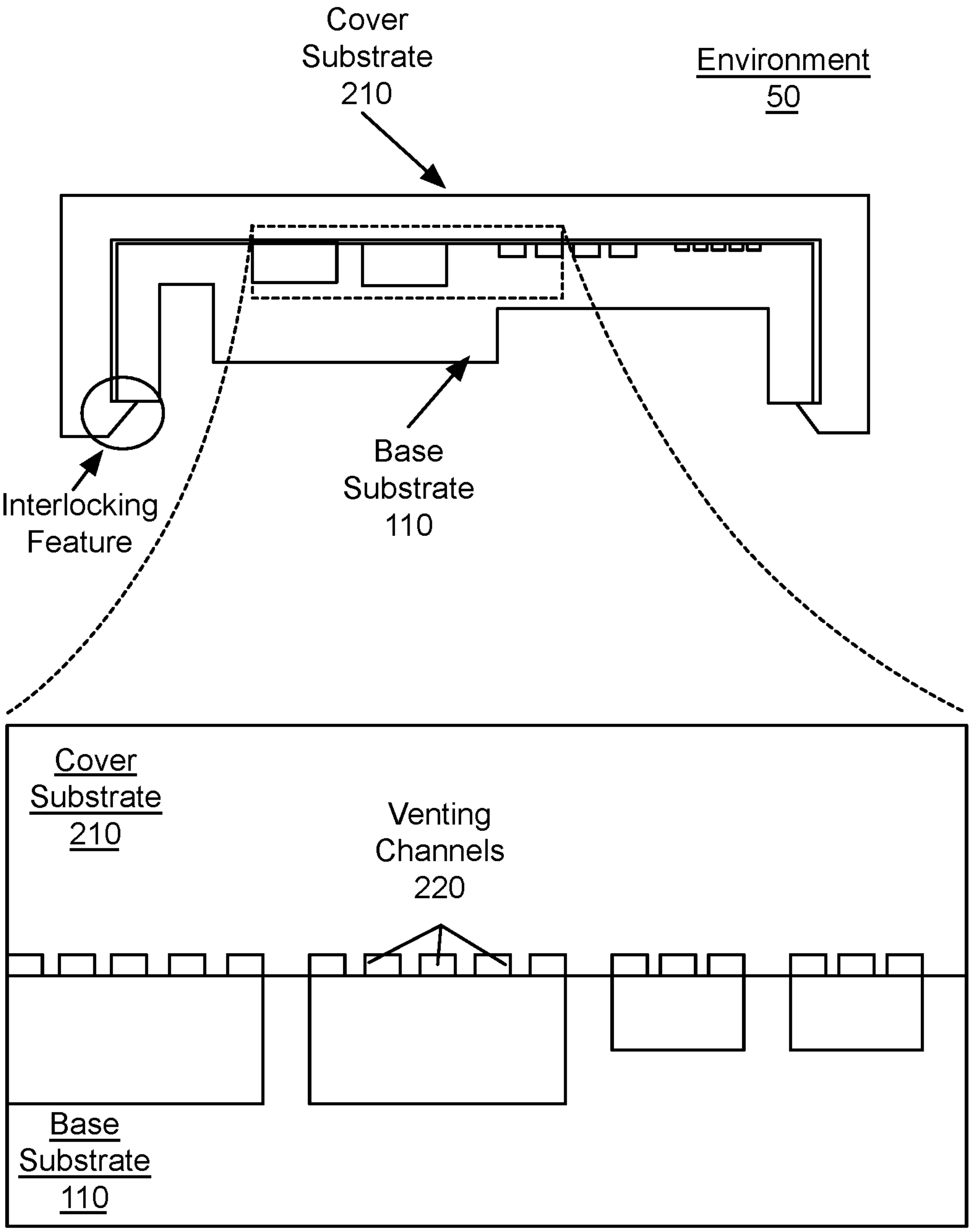

As shown in FIGS. 1A-1B, an embodiment of a microwell assembly 100 for target detection includes: a base substrate 110; and a set of sample processing regions (including sample processing region 120) defined at a broad surface of the substrate 110, wherein each of the set of sample processing regions includes: a set of microwell subarrays 130 arranged in a gradient between an upstream end 10 and a downstream end 90 of the sample processing region 120, and a boundary 190 separating the sample processing region 120 from adjacent sample processing regions. In relation to the gradient of microwell subarrays for each sample processing region, an initial microwell subarray 130 with wells having a first characteristic dimension (e.g., the smallest characteristic dimension) can be positioned at the upstream end 10 and a terminal microwell subarray 170 with wells having a second characteristic dimension (e.g., the largest characteristic dimension) can be positioned at the downstream end 90 of the sample processing region 120, with other variations described in more detail below.

In some embodiments, as shown in FIG. 1B, the microwell assembly 100 can include a cover substrate 210 configured to mate with the base substrate 110 in a coupled mode, the cover substrate 210 including a network of venting channels 220 facing the base substrate 110 (in the coupled mode), aligned with the set of sample processing regions upon mating the base substrate 110 with the cover substrate 210, and providing gas exchange between the base substrate 110 and an environment 50 (e.g., environment surrounding the microwell assembly, local environment between the base substrate 110 and the cover substrate 210, etc.). The cover substrate 210 can also be separated from the base substrate 110 by one or more functional layers, as described in more detail below.

The microwell assembly 100 functions to provide mechanisms for rapid sample distribution and processing in a low-cost manner, with specific applications in most probable number (MPN) determination. In particular, the microwell assembly can receive a sample volume and distribute it across multiple subarrays of microwells (e.g., with minimal user manual intervention), each subarray having a characteristic dimension, thereby facilitating rapid operation and performance of serial dilution tests, across multiple samples in parallel, to measure the concentrations of one or more target microorganisms in a sample (e.g., for food safety/food quality applications, for other applications). The microwell assembly 100 can allow for gas exchange between contents of the microwells and/or the environment surrounding the microwell assembly 100, while preventing liquid exchange, thereby providing humidity control and preventing evaporation. The microwell assembly 100 can also prevent liquid, pathogen, and/or conversion substrate cross-talk between different samples being processed. Additional functions of the microwell assembly 100 are described in further detail below with respect to individual elements of the microwell assembly no.

2.1 Base Substrate and Sample Processing Regions with Microwell Subarrays

2.1.1 Base Substrate

As shown in FIG. 1A, the microwell assembly 100 includes a base substrate 110 supporting a set of sample processing regions described in further detail below. The base substrate 110 thus functions to support a set of samples and to facilitate processes for detecting, estimating concentrations of, and/or characterizing presence of microorganisms in the set of samples. In some variations, the base substrate 110 can also function to permit gas exchange between contents of the microwells and the environment surrounding the microwell assembly 100, while preventing liquid exchange (e.g., with structural features and/or material properties), thereby providing humidity control and preventing evaporation, while preventing cross-talk between different samples being processed.

In material composition, the base substrate 110 can be composed of one or more of: a polymer (e.g., polypropylene, polydimethylsiloxane, polystyrene, polyvinyl chloride, polymethyl methacrylate, cyclic olefin copolymer, polycarbonate), a silicon-derived material, glass, a metallic material, a ceramic material, a natural material, a synthetic material, and/or any suitable material. In particular, material selection can be based upon one or more of: manufacturing considerations, surface properties desirable for sample processing, optical properties, bulk properties (e.g., in terms of porosity, in terms of density, etc.), surface properties, thermal properties, mechanical properties, and/or any other suitable properties. Furthermore, all parts of the base substrate 110 can be constructed using the same material(s), different materials (e.g., if each portion of the base substrate 110 has different design constraints), and/or any combination of materials. Furthermore, the base substrate 110 can be a unitary body, or a base substrate no having discrete portions that are coupled together (e.g., during manufacturing).

In relation to optical properties, the material(s) of the base substrate 110 can have any degree of transparency, reflectivity, or other optical characteristics. For instance, materials can be transparent to enable optical analysis, interrogation, or observation (e.g., from a bottom surface of the base substrate 110, from a top surface of the base substrate 110, etc.), but can be opaque, transparent, translucent, and/or any suitable opacity. For instance, in relation to bulk properties such as porosity (e.g., to provide gas exchange functionality), the base substrate 110 may not be transparent if a high degree of porosity is desired. Furthermore, variations of the materials and/or configurations can be configured to promote containment of detectable signals (e.g., in relation to containment of fluorescence, in relation to containment of other conversion substrates) within individual microwells of the base substrate 110. Furthermore, variations of materials of the substrate can be configured and/or treated to prevent absorption of sample processing materials (e.g., fluorogenic substrates, colorimetric substrates, other conversion substrates, sample, etc.).

In relation to bulk properties, the material(s) of the base substrate 110 can be configured with a level of porosity that permits gas exchange between contents of the microwells and the environment (e.g., an environment of the system) through the base substrate 110, while preventing liquid exchange, thereby providing humidity control and preventing evaporation, while preventing cross-talk between different samples being processed. Additionally or alternatively, in relation to bulk properties, material(s) of the base substrate 110 can be configured with a level of density or other bulk characteristic appropriate for sample processing and/or incubation purposes required to support the viability of microorganisms. In variations, the base substrate 110 can be composed of or otherwise incorporate a polymer (e.g., polytetrafluoroethylene (PTFE), polyethylene (PE), polyvinyl alcohol (PVA), etc.), a ceramic, or another suitable material (e.g., natural material, synthetic material) having suitable intrusion ratings (e.g., according to the IP scale, according to another rating scale) or particle retention characteristics (e.g., with rated retention of particles below 1 micron, with rated retention of particles greater than or equal to 1 micron). In an example, the base substrate 110 can be composed of a PTFE-based material with an IP rating (e.g., IP 65-69); however, the base substrate 110 can alternatively be composed of a non-porous material, with gas exchange enabled by other elements (e.g., vents, microscale channels, nanoscale channels, etc.) of the microwell assembly 100.

In relation to surface properties, the material(s) of the base substrate 110 can be configured with desired hydrophilic/hydrophobic properties (e.g., a high degree of hydrophilicity) determined by, for instance, contact angle and wettability characteristics. In relation to other electrical and physical properties, the material(s) of the base substrate 110 can be configured with a desired charge (e.g., in relation to characteristics of sample fluids and/or sample processing fluids used), electric field characteristics, conductivity, resistance, and/or any other suitable surface or physical characteristics. Additionally or alternatively, the material(s) of the base substrate 110 are preferably configured to be non-reactive with fluids and micro-organisms used during sample processing. Additionally or alternatively, the material(s) of the base substrate 110 are configured to absorb inhibitors that prevent the viability of microorganisms and/or the conversion of detectable enzymatic substrate. Additionally or alternatively the surface of the base substrate 110 exposed to receiving fluid may have desired surface finish.

In relation to thermal properties, the material(s) of the base substrate 110 can be configured with desired thermal properties, with respect to heat transfer and/or heat retention characteristics. In particular, the base substrate 110 can be configured with desired thermal conductivity and/or heat capacity characteristics (e.g., as appropriate to sample incubation steps). In one variation, the base substrate 110 can be configured with thermal properties such that it can efficiently transfer heat to or away from fluids contacting the base substrate 110. For instance, in variations where the base substrate 110 is coupled to a heating or cooling element, the base substrate 110 can be configured to facilitate transfer of heat to contents of the microwells during incubation and/or transfer of heat away from the fluids. However, the base substrate 110 can have other suitable thermal properties based on application of use. For instance, the base substrate 110 can be configured with low thermal conductivity (e.g., as an insulative material), such that the material does not significantly affect temperatures of the fluids it contacts during operation.

In relation to mechanical properties, material(s) of the base substrate 110 can be configured with desired mechanical properties, including one or more of: stiffness, strength, elastic behavior, hardness, and other properties. Additionally or alternatively, the base substrate can be configured to be compatible with automated plate arm robotic subsystems.

In dimensions, the base substrate 110 can have the format of an SBS microwell plate (e.g., 127.76 mm×85.48 mm footprint); however, the base substrate 110 can alternatively have other suitable dimensions. The plates of the microwell assembly may additionally or alternatively be designed to be easily stackable for packaging or for use during sample runs.

Additionally or alternatively, the base substrate 110 can be configured to be sterilizable (e.g., using an autoclave, using other sterilization methods, etc.).

2.1.2 Sample Processing Regions with Microwell Subarrays

As shown in FIG. 1A, the base substrate 110 defines a set of sample processing regions (including sample processing region 120 shown in the FIGURES), wherein each of the set of sample processing regions includes: a set of microwell subarrays 130 arranged in a gradient (e.g., in volumetric capacity, in size, in surface area, in footprint, in cross-sectional area, etc.) between an upstream end 10 and a downstream end 90 of the sample processing region 120. The set of sample processing regions functions to receive a set of samples and to facilitate distribution of the set of samples across a set of microwell subarrays, in order to enable operation of serial dilution tests for each sample, for detection of one or more targets (e.g., targets associated with food safety and/or food quality). In some variations, the set of sample processing regions can be configured to store dried sample processing materials (e.g., media, fluorometric substrates, colorimetric substrates, other dyes, etc.) prior to receiving samples, in order to increase efficiency of sample processing. Additionally or alternatively, in other variations, the set of sample processing regions can include other suitable components (e.g., pre-packaged components). In some variations, the set of sample processing regions can be configured to be hydrophilic, hydrated, treated, and/or blocked with a non-specific absorption agent.

Figure 2:
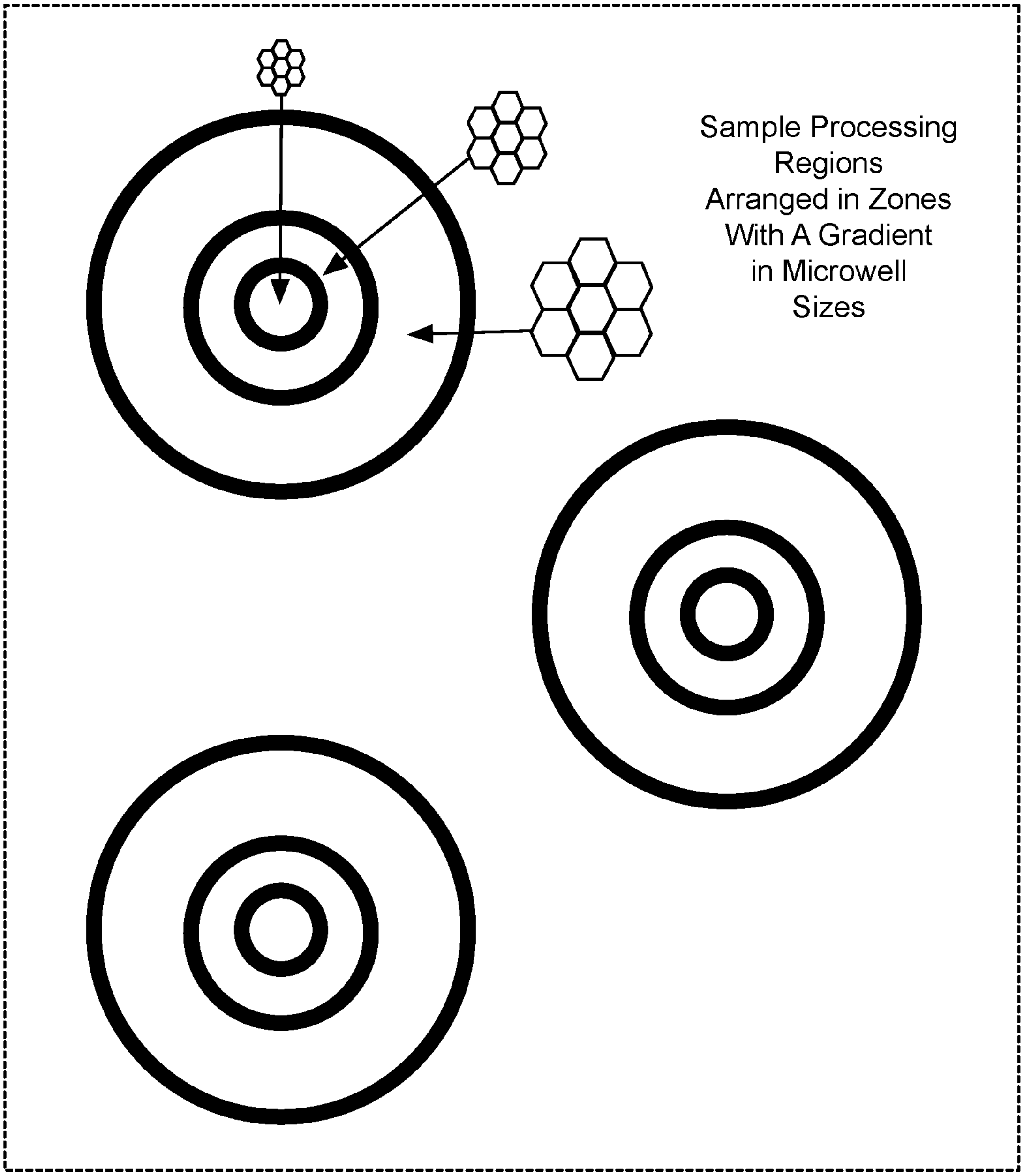
FIG. 2 depicts schematic representations of a variation of a microwell assembly for target detection.

In variations, the set of sample processing regions can be arranged as a set of lanes spanning the broad surface of the base substrate 110, where each region is configured to receive a separate sample, such that the samples can be processed in parallel in a high throughput manner. In embodiments where the broad surface of the base substrate 110 has a long axis and a short axis, the set of sample processing regions can be arranged parallel to the long axis or parallel to the short axis (e.g., in relation to the number and configuration of samples for testing and/or number of microwell sizes desired). However, the set of sample processing regions can alternatively be arranged relative to another suitable axis. Furthermore, in other variations, each of the set of sample processing regions may not be configured as a lane with longitudinally-defined microwell subarrays. For instance, in another variation shown in FIG. 2, each of the set of sample processing regions can be defined as a zone (e.g., circular zone, ellipsoid zone, polygonal zone, amorphous zone, etc.), and the microwell subarrays can be arranged along another suitable axis (e.g., radial axis, circumferential axis, etc.) or within another suitable coordinate system.

Figure 3A:
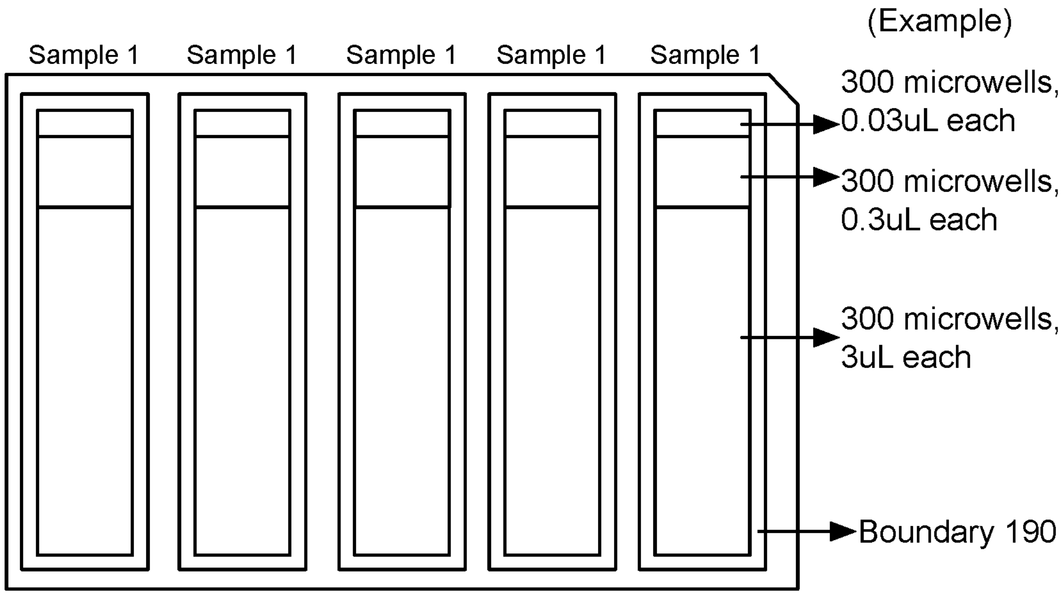
FIGS. 3A-3B depict schematic representations of specific examples of a microwell assembly for target detection.
Figure 3B:
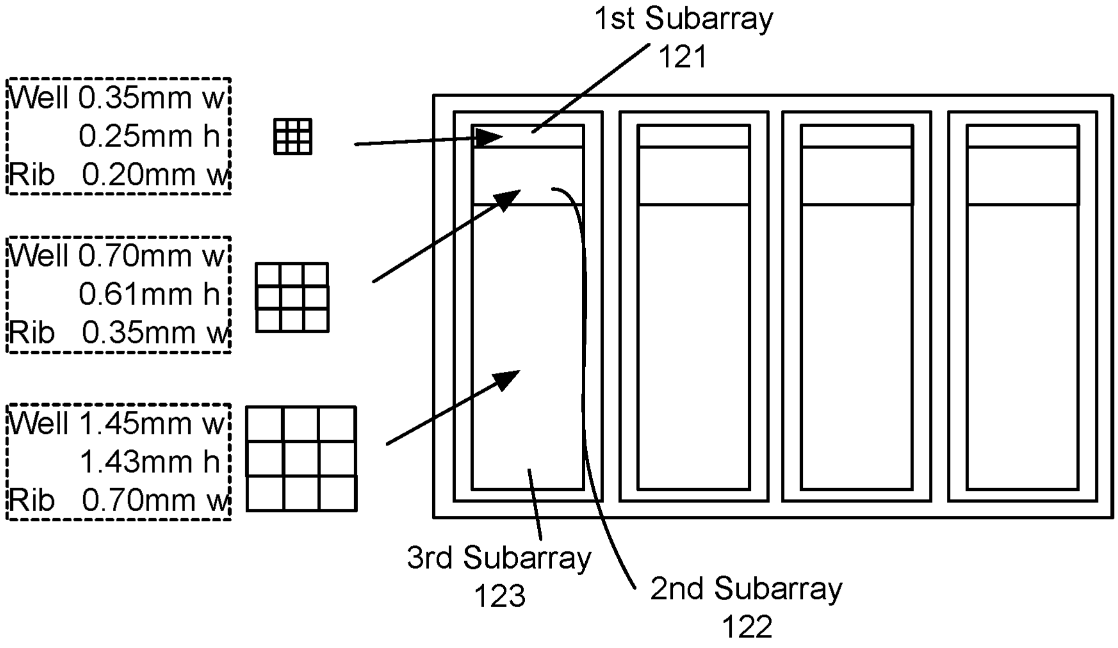

In variations, the number of sample processing regions included in the microwell assembly 100 can be governed by the dimensions of the base substrate 110 (with examples provided above), in relation to the characteristic microwell dimensions and number of individual microwells desired for each microwell subarray, where microwell dimensions and number of microwells implemented can be optimized for operation of serial dilution tests, in relation to sample volume received per region, for MPN determination. In examples (two of which are shown in FIGS. 3A and 3B), the set of sample processing regions can include between 2 and 7 sample processing regions. However, in other variations, the set of sample processing regions can include another suitable number of sample processing regions (e.g., less than 2 sample processing regions, more than 7 sample processing regions).

As described briefly above, each of the set of sample processing regions can include: a set of microwell subarrays 130 arranged in a gradient between an upstream end 10 and a downstream end 90 of the sample processing region 120, and a boundary 190 separating the sample processing region 120 from adjacent sample processing regions. The set of microwell subarrays 130 functions to provide, for each sample being processed, a set of partitions with a known distribution of volumes for performing determinations of MPN and/or other assays for target detection from a sample. Each of the set of microwell subarrays can thus have partitions (e.g., microwells) having a different characteristic volume for each of the partitions, in order to provide a suitable number of dilutions and partitions per dilution to generate minimum and maximum detectable MPN values with suitable confidence limits. Aspects of MPN determination and confidence limits are described further below.

In variations, a sample processing region of the base substrate 110 can include between 2 and 10 microwell subarrays, each of the set of microwell subarrays having between 10 and 100,000 partitions. Each sample processing region can accept (by providing an aggregate volumetric capacity) between 0.01 mL and 10 mL of sample, in order to provide MPN values between a minimum and maximum range of 5 to 3,000,000 for a MPN assay, with suitable confidence limits. However, a sample processing region can include other suitable numbers of microwell subarrays (e.g., less than 2 subarrays, greater than 10 subarrays), each having other suitable numbers of partitions (e.g., less than 10 partitions, greater than 100,000 partitions, etc.) in order to accept other sizes of sample volumes (e.g., less than 0.01 mL, greater than 10 mL), for enabling determination of MPN within another suitable range.

In particular, the number of microwell subarrays/characteristic volumes, and number of partitions per microwell subarray can be configured in association with determination of the solution for λ in expression [1] below, where exp(x) is $e^x$, K denotes the number of dilutions, $g_j$ denotes the number of positive (or growth) tubes in the jth dilution, $m_j$ denotes the amount of the original sample put in each tube in the jth dilution, and $t_j$ denotes the number of tubes in the jth dilution.

$$\sum_{j=1}^{k} \frac{g_j m_j}{1-\exp(-\lambda m_j)} = \sum_{j=1}^{k} t_j m_j \quad [1]$$

In specific examples, shown in FIGS. 3A and 3B, each of the set of sample processing regions can have three microwell subarrays distributed in a gradient along a longitudinal axis of the sample processing region, where a first microwell subarray 121 has a characteristic volume of 0.03 microliters per partition and 300 microwell partitions. As shown in FIG. 3B, each microwell of the first microwell subarray 121 can have a 0.35 mm width, a 0.25 mm height, and ribs of 0.2 mm width separating each microwell from adjacent microwells. The sample processing region can also include a second microwell subarray 122 that has a characteristic volume of 0.3 microliters per partition and 300 microwell partitions where, as shown in FIG. 3B, each microwell of the second microwell subarray 122 can have a 0.70 mm width, a 0.61 mm height, and ribs of 0.35 mm width separating each microwell from adjacent microwells. The sample processing region can also include a third microwell subarray 123 that has a characteristic volume of 3 microliters per partition and 300 microwell partitions where, as shown in FIG. 3B, each microwell of the third microwell subarray 123 can have a 1.45 mm width, a 1.43 mm height, and ribs of 0.70 mm width separating each microwell from adjacent microwells. The microwells can have a suitable pitch to facilitate distribution of sample fluid across the microwell subarrays. Such a configuration can enable each sample processing region to process an ~1 mL sample in order to allow determination of MPN per sample.

In variations, a cross section of each microwell can be polygonal (e.g., hexagonal, rectangular, etc.) or non-polygonal (e.g., circular, ellipsoidal, amorphous, etc.) in cross-section (e.g., a cross-section taken across a plane parallel to the broad surface of the base substrate 110). Additionally or alternatively, a cross section of each microwell can be tapered along a direction away from the broad surface of the substrate 110 toward the base of each microwell. As such, each well can have an opening at the broad surface of the base substrate 110, such, that sub-volumes of a sample can enter the microwells from a direction perpendicular to the broad surface of the base substrate 110. However, the opening(s) of the microwells can be configured in another suitable manner. Furthermore, the microwells can be arranged in a packed configuration (e.g., hexagonal close packed, rectangular close packed, other close packed configuration, etc.) or non-packed configuration. For instance, wells of an initial subarray of the set of microwell subarrays can be arranged in a first packed configuration (e.g., hexagonal close packed, rectangular close packed, other close packed configuration, etc.), and wells of a terminal subarray of the set of microwell subarrays can be arranged in a second packed configuration (e.g., hexagonal close packed, rectangular close packed, other close packed configuration, etc.).

In relation to the gradient of microwell subarrays for each sample processing region, an initial microwell subarray 130 with wells having a first characteristic dimension (e.g., the smallest characteristic dimension) can be positioned at an upstream end 10 of the sample processing region, and a terminal microwell subarray 170 with wells having a second characteristic dimension (e.g., the largest characteristic dimension) can be positioned at a downstream end 90 of the sample processing region 120. As such, the microwell subarrays can have larger and larger characteristic microwell dimensions in an upstream to downstream direction. Alternatively, the microwell subarrays can have smaller and smaller characteristic microwell dimensions in an upstream to downstream direction (e.g., such that the initial microwell subarray 130 has wells with the largest characteristic dimension, and the terminal subarray 170 has wells with the smallest characteristic dimension). Still alternatively, the microwell arrays may be organized in a gradient or non-gradient in another suitable manner (e.g., along another directional axis, in relation to another microwell characteristic). Still alternatively, each sample processing region can be otherwise configured (e.g., with stepwise increments across the gradient of microwells) in other variations. For instance, well dimensions may not be organized with a gradient in an upstream to downstream direction, but rather in a lateral direction (e.g., orthogonal to the upstream to downstream direction).

As shown in FIGS. 3A and 3B, the base substrate 110 can include a set of boundaries (including boundary 190 shown in FIG. 1A) separating each sample processing region from adjacent sample processing regions, thereby functioning to prevent sample cross-talk. The boundary 190 can be configured as a recess (e.g., as a moat, as in a recessed channel forming a perimeter), or as a protrusion, or can alternatively include recessed and protruding portions. The boundary 190 can also be configured as a region configured to promote evaporation or absorption of sample overflow, whereby, upon entry of sample into the region, the sample evaporates and/or is absorbed to the walls of the boundary 190. In variations wherein the boundary 190 is defined as a recessed perimeter about a sample processing region, the boundary 190 can function as a moat into which sample overflow can be received during sample processing. Alternatively, the boundary 190 can serve another suitable purpose.

Additionally or alternatively, the boundary 190 can be composed of an absorbent material configured to receive and soak up overflowing material from the sample processing regions.

Additionally or alternatively, the boundary or boundaries can include one or more outlets (e.g., to a waste chamber), away from the sample processing regions, such that overflowing material can be delivered away from the sample processing regions and prevent re-entry into the sample processing regions.

Furthermore, while the base substrate 110 can be physically contiguous, in variations, the base substrate 110 can be configured to be separatable between adjacent sample processing regions (e.g., with perforations, with reversibly locking components, etc.). However, the base substrate 110 can alternatively be configured to be non-separatable.

While embodiments, variations, and examples of the microwells of the sample processing region are described above, aspects of the microwells and/or sample processing regions can be adapted from one or more of: U.S. application Ser. No. 16/048,104, filed 27 Jul. 2018; U.S. application Ser. No. 16/049,057, filed 30 Jul. 2018; U.S. application Ser. No. 15/720,194, filed 29 Sep. 2017; U.S. application Ser. No. 15/430,833, filed 13 Feb. 2017; U.S. application Ser. No. 15/821,329, filed 22 Nov. 2017; U.S. application Ser. No. 15/782,270, filed 12 Oct. 2017; U.S. application Ser. No. 16/049,240, filed 30 Jul. 2018; U.S. application Ser. No. 15/815,532, filed 16 Nov. 2017; U.S. application Ser. No. 16/115,370, filed 28 Aug. 2018, U.S. application Ser. No. 16/564,375, filed 9 Sep. 2019, and U.S. application Ser. No. 16/816,817, filed 12 Mar. 2020, which are each incorporated in their entirety by this reference.

2.2 Cover Substrate and Optional Elements

2.2.1 Cover Substrate

Figure 4:
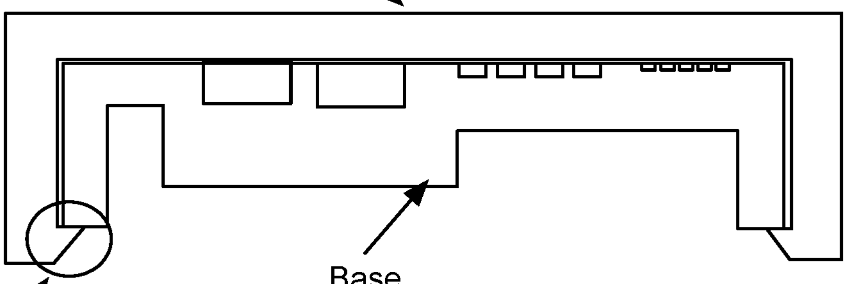
FIG. 4 depicts a side view of a microwell assembly, with a cover component, for target detection.

As shown in FIGS. 1B and 4, in some embodiments, the microwell assembly 100 can include a cover substrate 210 configured to mate with the base substrate 110. The cover substrate 210 functions to protect samples being processed and/or incubated at the base substrate 110 from contamination, while allowing gas exchange with the environment (e.g., environment surrounding the microwell assembly, local environment between the base substrate 110 and the cover substrate 210, etc.).

In material composition, the cover substrate 210 can be composed of one or more of: a polymer (e.g., polypropylene, polydimethylsiloxane, polystyrene, polyvinyl chloride, polymethyl methacrylate, cyclic olefin copolymer, polycarbonate, silicone, polydimethysiloxane), a silicon-derived material, glass, a metallic material, a ceramic material, a natural material, an elastomeric material, a porous material, a synthetic material, and/or any suitable material. In particular, material selection can be based upon one or more of: manufacturing considerations, surface properties desirable for sample processing, optical properties, bulk properties (e.g., in terms of porosity, in terms of density, etc.), surface properties, thermal properties, mechanical properties, and/or any other suitable properties. Furthermore, all parts of the cover substrate 210 can be constructed using the same material(s), different materials (e.g., if each portion of the cover substrate 210 has different design constraints), and/or any combination of materials. Furthermore, the base substrate 110 can be a unitary body, or a base substrate 110 having discrete portions that are coupled together (e.g., during manufacturing).

In relation to optical properties, the material(s) of the cover substrate 210 can have any degree of transparency, elasticity, reflectivity, or other optical characteristics. For instance, materials can be transparent to enable optical analysis, interrogation, or observation (e.g., from a top surface of the cover substrate 210, etc.), but can be opaque, transparent, translucent, and/or any suitable opacity. For instance, in relation to bulk properties such as porosity (e.g., to provide gas exchange functionality), the cover substrate 210 may not be transparent if a high degree of porosity is desired.

In relation to bulk properties, the material(s) of the cover substrate 210 can be configured with a level of porosity that permits gas exchange between samples being processed and the environment, while preventing liquid exchange, thereby providing humidity control and preventing evaporation. Additionally or alternatively, in relation to bulk properties, material(s) of the cover substrate 210 can be configured with a level of density or other bulk characteristic appropriate for sample processing and/or incubation purposes. In variations, the cover substrate 210 can be composed of or otherwise incorporate a polymer (e.g., polytetrafluoroethylene (PTFE), polyethylene (PE), polyvinyl alcohol (PVA), etc.), a ceramic, or another suitable material (e.g., natural material, synthetic material) having suitable intrusion ratings (e.g., according to the IP scale, according to another rating scale) or particle retention characteristics (e.g., with rated retention of particles below 1 micron, with rated retention of particles greater than or equal to 1 micron). In an example, the cover substrate 210 can be composed of a PTFE-based material with an IP rating (e.g., IP 65-69); however, the cover substrate 210 can alternatively be composed of a non-porous material, with gas exchange enabled by other elements of the microwell assembly 100. Additionally or alternatively, the cover substrate 210 can be converted from a porous to a non-porous state to prevent contamination of the environment upon termination of the assay.

In relation to surface properties, the material(s) of the base substrate 110 can be configured with desired hydrophilic/hydrophobic properties (e.g., a high degree of hydrophobicity) determined by, for instance, contact angle and wettability characteristics. In relation to other electrical and physical properties, the material(s) of the cover substrate 210 can be configured with a desired charge (e.g., in relation to characteristics of sample fluids and/or sample processing fluids used), electric field characteristics, conductivity, resistance, and/or any other suitable surface or physical characteristics. Additionally or alternatively, the material(s) of the cover substrate 210 are preferably configured to be non-reactive with fluids used during sample processing.

In relation to thermal properties, the material(s) of the cover substrate 210 can be configured with desired thermal properties, with respect to heat transfer and/or heat retention characteristics. In particular, the cover substrate 210 can be configured with desired thermal conductivity and/or heat capacity characteristics (e.g., as appropriate to sample incubation steps). In one variation, the cover substrate 210 can be configured with thermal properties such that it can efficiently transfer heat to or away from the microwell assembly 100 during sample processing and/or incubation.

Figure 5:
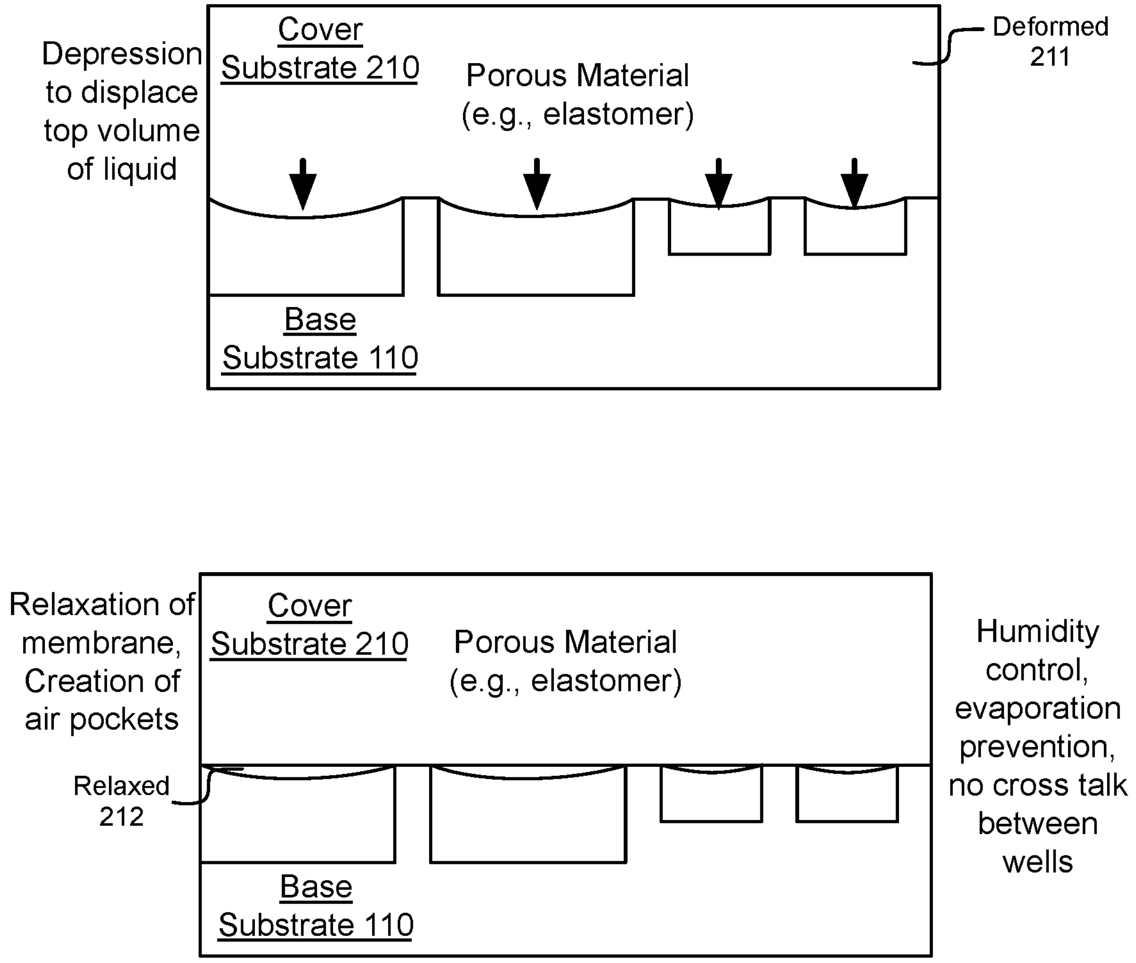
FIG. 5 depicts side views of operation modes of a microwell assembly, with an elastomeric cover component.

In relation to mechanical properties, material(s) of the base substrate **11*o* can be configured with desired mechanical properties, including one or more of: stiffness, strength, elastic behavior, hardness, and other properties. For instance, as shown in FIG. 5, variations of the cover substrate 210 can be composed of an elastomeric material that can be elastically deformed, where reversible deformation of the elastomeric cover substrate 210 can enable operation modes that facilitate sample handling. For instance, as shown in FIG. 5, elastic properties of the cover substrate 210 can provide a deformed operation mode 211 in which a sub-volume (e.g., top portion of fluid) is displaced from each microwell of a sample processing region, and a relaxed operation mode 212 in which the cover substrate relaxes to a baseline state to create pockets (e.g., air pockets) between the cover substrate 210 and the microwells of the base substrate. Such operation modes can thus further allow the microwell assembly 100 to process samples with provision of humidity control, evaporation prevention, and prevention of cross talk between microwells of the base substrate 110 (e.g., post sample distribution into the set of sample processing regions). The cover substrate 210** can, however, have other suitable mechanical properties to provide modes of operation.

In examples in which the cover substrate 210 is elastomeric, the cover substrate 210 can be composed of an elastomer (e.g., polyether/polyamide material, polyurethane material, polyester material, etc.), where the elastomer can be porous to provide gas exchange with the environment. However, the cover substrate 210 can be composed of other suitable materials (e.g., microporous polycarbonate, cellulose acetate, nitrocellulose, glass fiber, microporous nylon, polytetrafluoroethylene, regenerated cellulose, polyvinyl fluoride, polypropylene, microporous polyester, polyvinylidene fluoride, re-probing charged nylon, etc.)

Figure 6A:
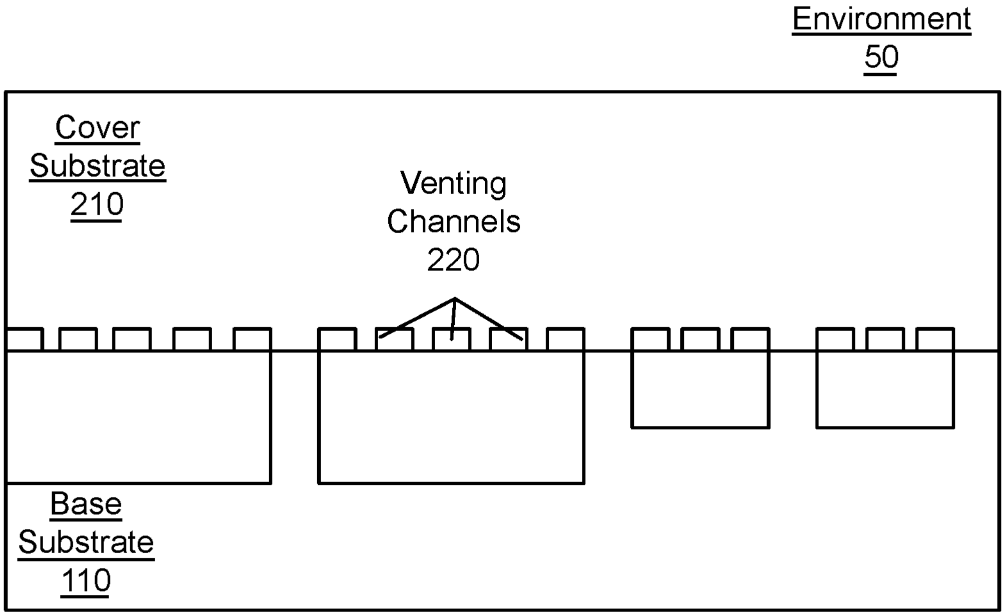
FIGS. 6A-6B depict views of variations of venting channels of a microwell assembly for target detection.
Figure 6B:
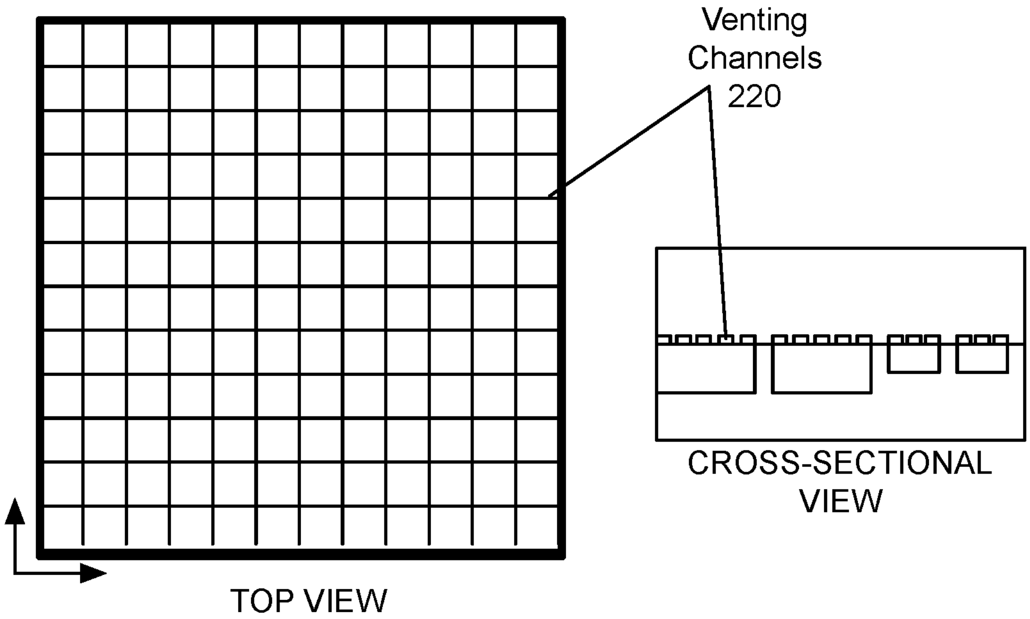

As shown in FIGS. 6A-6B, the cover substrate 210 defines a network of venting channels 220 facing the base substrate 110 (e.g., opposing the base substrate 110 when assembled with the cover substrate 210). The venting channels 220 are preferably aligned with the set of sample processing regions upon mating the base substrate 110 with the cover substrate 210, thereby providing gas exchange between contents of the base substrate 110 and an environment 50 surrounding the microwell assembly 100.

As shown in the cross-sectional image of FIG. 6A, the venting channels 220 can span the entirety of the cover substrate 210 (e.g., along one or more axes), in order to allow gas exchange between the microwell subarrays of each sample processing region and the environment (e.g., incubation environment). In the example shown in FIG. 6B, a first subset of channels 221 can span the cover substrate 210 parallel to a first axis, and a second subset of channels 222 can span the cover substrate 210 parallel to a second axis, such that the first subset of channels 221 and the second subset of channels 220 cross each other (e.g., are orthogonal to each other and/or are in fluid communication with each other). However, individual subsets of channels can be arranged in another suitable manner. In the examples shown in FIGS. 6A and 6B, the network of channels 220 are open to the environment at lateral/peripheral edges of the cover substrate 210; however, in other variations, the network of channels 220 can open to the environment at another suitable portion of the cover substrate 210 (e.g., by passing into the thickness of the cover substrate 210 and opening at another surface). The venting channels 220 are preferably hydrophobic and of small capillary dimensions (e.g., <200 microns) to prevent intrusion of fluid from the sample. Alternatively, the venting channels 220 can have another degree of hydrophobicity and/or have capillary dimensions greater than or equal to 200 microns. Additionally or alternatively, the venting channel dimensions can be smaller (e.g., less than 50% cross section and/or substantially less than 25% of the cross section of a characteristic microwell dimension). However, the venting channels 220 can have other suitable dimensions in relation to characteristic microwell dimensions.

In forming an assembly, the cover substrate 210 can mate with the base substrate 110 by inclusion of interlocking features (e.g., a first locking portion at the cover substrate 210 complementary to a second locking portion at the base substrate 110). For instance, as shown in FIG. 4, the cover substrate can include a lip or a set of tabs that engage a surface (e.g., bottom surface, peripheral surface) of the base substrate 110, thereby providing coupling between the base substrate 110 and the cover substrate 210. In other variations, coupling can be provided with another suitable mechanism (e.g., press fit mechanism, snap fit mechanism, magnetic mechanism, adhesive mechanism, gravity mechanism, etc.). Coupling between the base substrate 110 and the cover substrate 210 can be reversible or otherwise permanent. In still other variations, the cover substrate 210 may not be configured to couple with the base substrate 110.

In still other variations, the cover substrate 210 can have the form of one or more films (e.g., adhesive films, porous films, porous adhesive films) covering the set of sample processing regions. For instance, in one such variation, the cover substrate 210 can include a set of films (e.g., porous adhesive films) corresponding to the number of the set of sample processing regions or samples being processed, where the set of films can be applied post-sample distribution into the base substrate. The set of films can further be removed from the base substrate 110 when needed (e.g., by automated platform 300 aspects described, by a user, etc.), according to various assays being performed and/or operation modes described in more detail below.

2.2.2 Optional Elements

Figure 7A:
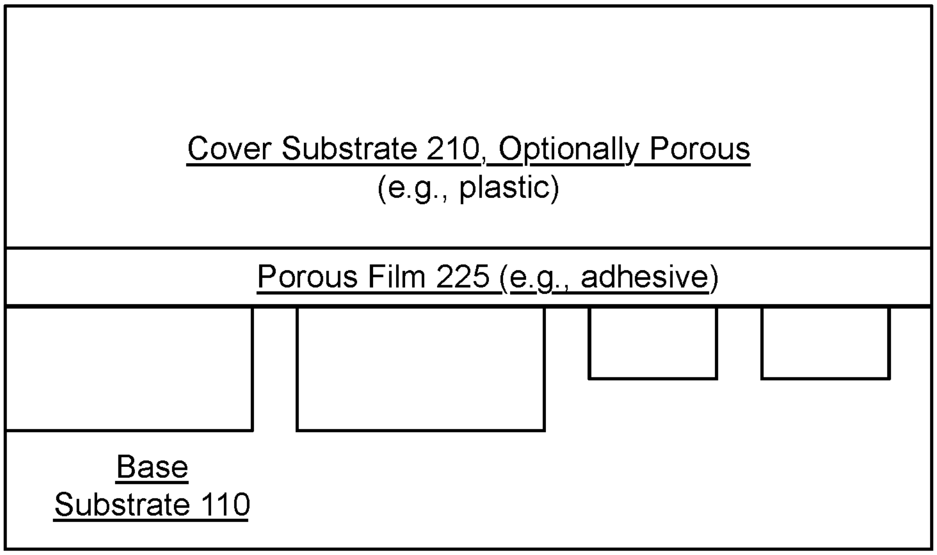
FIGS. 7A-7B depict views of variations of porous film layers of a microwell assembly for target detection.

The cover substrate 210 can also be separated from the base substrate 110 by one or more functional layers. For instance, as shown in FIG. 7A, the cover substrate 210 can be separated from the base substrate 110 by a film layer 225, in order to facilitate coupling between the cover substrate 210 and the base substrate 110, provide further separation between adjacent sample processing regions to prevent sample cross talk, to perform microwell sealing functions, and to enable gas exchange between samples at the base substrate 110 and the environment. In more detail, the film layer 225 and/or cover substrate 220 can function to prevent fluorogenic and/or chromogenic substrates or other sample processing materials/reagents from contaminating adjacent microwell partitions, promote growth of targets (e.g., bacteria, yeast, mold, etc.) for detection, enable gas exchange, and prevent evaporation while not being cost-prohibitive to produce.

Figure 7B:
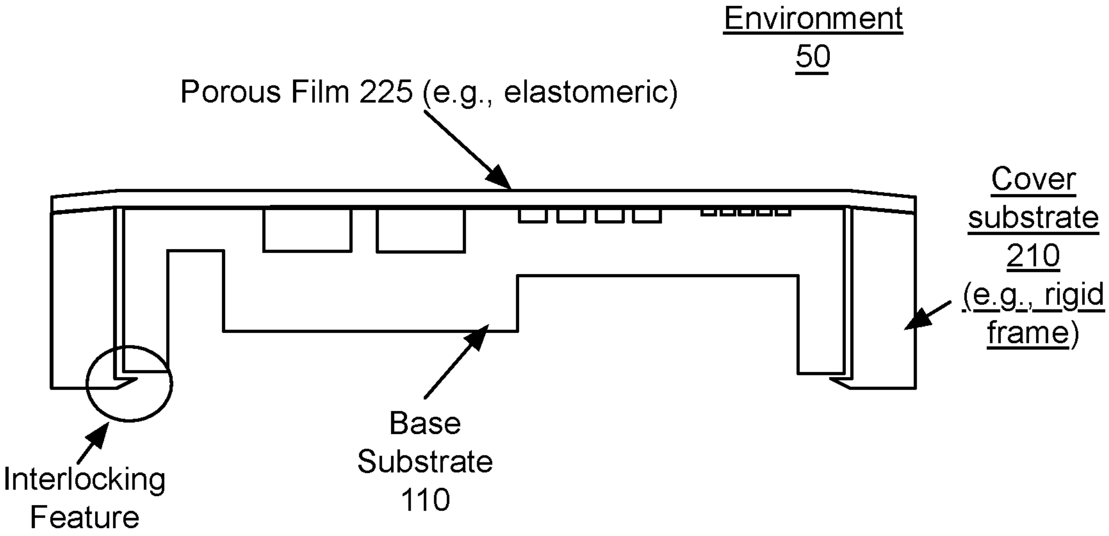

The film layer 225 can be entirely situated between the cover substrate 210 and the base substrate 110. Alternatively, as shown in FIG. 7B, the cover substrate 210 can be configured to form a boundary about the base substrate 110, and the film layer 225 can couple the base substrate 110 to the cover substrate 210, while interfacing with the sample processing regions to provide gas exchange. In examples, the film layer 225 can be composed of a porous polymer (e.g., polyether/polyamide material, polyurethane material, polyester material, nylon material, etc.), to provide gas exchange with the environment. However, the film layer 225 can be composed of other suitable materials. For instance, in some applications, the film layer 225 can be replaced or supplemented by a hydrogel material that binds a sample processing substrate (e.g., fluorogenic substrate, colorimetric substrate) for detection, where the hydrogel material is delivered in a flow state to the set of sample processing regions and transitions to a sol state during incubation. The film layer 225 can be continuous or divided into a number of subregions corresponding to the number of the set of sample processing regions or samples being processed.

Furthermore, the microwell assembly can include multiple membranes, in relation to design functionality and/or application of use of the system 100.

Figure 8:
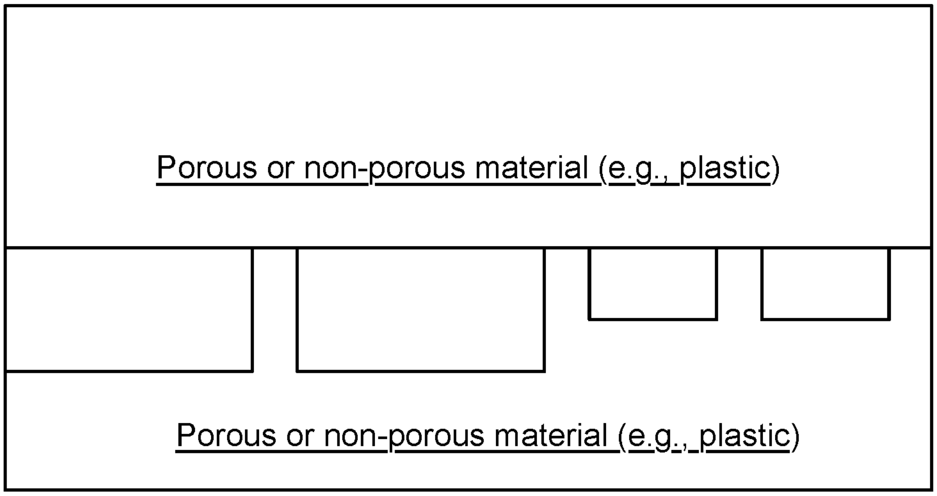
FIG. 8 depicts variations of a microwell assembly where the base substrate and/or the cover substrate are composed of porous materials.

While variations of porous base substrate 110 materials and/or cover substrate 210 materials are described above, one or more of the base substrate 110 and the cover substrate 210 may not be porous or composed of a material that promotes gas exchange with the environment, as shown in FIG. 8.

Furthermore, variations of the microwell assembly 100 can additionally or alternatively include or support other suitable elements (e.g., oil layers, other partitioning material layers, buoyant hydrophobic particles, buoyant self-polymerizing material, biological membranes, cellular layers, biological coating, sample processing substrates included or bound to microwell surfaces, configuration media, dilution media, media provided in a lyophilized state, etc.) that facilitate sample processing and/or sample incubation, while facilitating gas exchange with the environment and preventing sample cross talk.

3. PLATFORM

Figure 9:
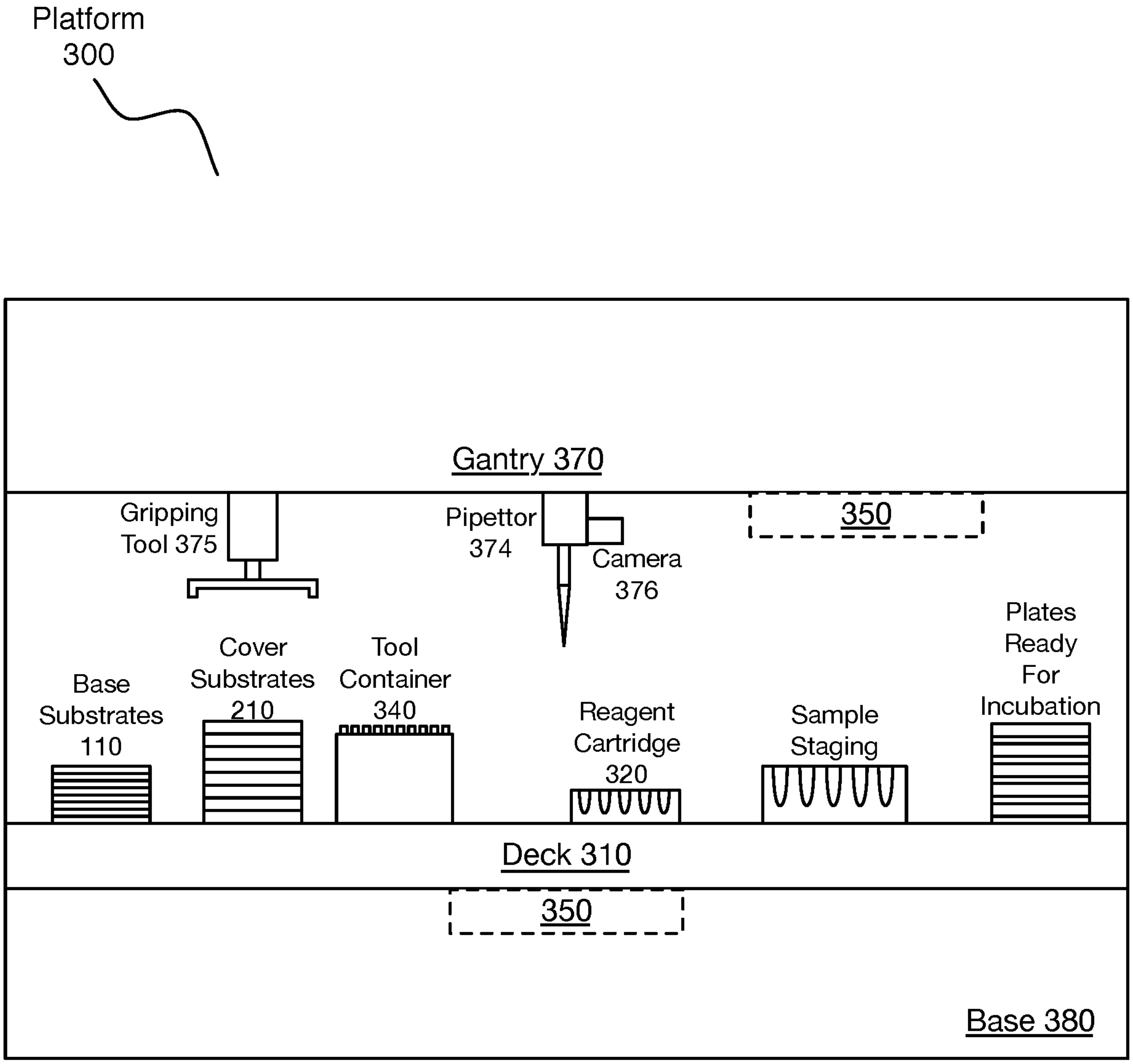
FIG. 9 depicts an embodiment of a platform for automating processing of samples using units of a microwell assembly.

As shown in FIG. 9, an embodiment of a platform 300 for automated sample processing (e.g., for processing samples using units of the microwell assembly 100 described above) includes: a deck 310 supporting and positioning a set of sample processing elements; a gantry 370 for actuating tools for interactions with the set of sample processing elements supported by the deck 310; and a base 380 supporting various processing subsystems and a control subsystems in communication with the processing subsystems, where the control subsystems control states of the deck 310, the set of sample processing elements, and the gantry 370 in order to transition the platform 300 between various operation modes. In examples, the platform 300 can provide functionality for loading samples in a high throughput manner (e.g., with sample loading below 60 s/sample, with processing of greater than 600 samples in 8 hours, etc.) and/or sample reading in a high throughput manner (e.g., with sample reading at faster than 10 s/sample, with reading of greater than 500 samples per hour, etc.). Embodiments, variations, and examples of operation modes, which provide various workflows, are described in further detail in Section 4 below.

3.1. Deck and Deck-Supported Elements

As shown in FIG. 9, the deck 310 functions as a platform to support and position one or more components (e.g., at a top broad surface, at a top and bottom broad surface, at a side surface, etc.) for automated processing of samples using units of the microwell assembly 100 described above. Furthermore, the deck 310 can function to position one or more components to align with or otherwise interact with fluid processing subsystems, imaging subsystems, gripping/manipulation subsystems, and/or other subsystems coupled to the gantry 370 and/or base 380, as described below. In this regard, the deck 310 can be stationary as a reference platform, while other components are actuated into position for interacting with elements of the deck 310. Alternatively, the deck 310 can be coupled to one or more actuators for positioning elements of the deck 310 for interactions with other subsystems.

In the embodiment shown in FIG. 9, the deck 310 provides a platform supporting the set of sample processing elements, where the sample processing elements can include disposable and/or reusable components, where the components include containers for containing sample processing materials and/or tools for processing samples (e.g., in relation to fluid handling, in relation to material separation, in relation to heating and cooling, etc.). In embodiments, the deck 310 can support a set of sample processing elements including one or more units of: a reagent cartridge 320, units of the microwell assembly 100 described above (e.g., in storage, disassembled with separate base substrates 110 and cover substrates 210, and in-use positions for sample processing), sample staging containers 330 (for staging samples prior to transfer to the microwell assembly 100), a tool container 340, and/or other subsystems.

Additionally or alternatively, the deck 310 can include other suitable components associated with an imaging subsystem (e.g., fluorescence detection subsystems, brightfield camera subsystems, confocal microscope subsystems, spectroscopic detection subsystems, Total Internal Reflection Fluorescence (TIRF) subsystems, Nuclear Magnetic Resonance (NMR) subsystems, Raman Spectroscopy (RS) RS subsystems, cellular phone with optic accessories to improve pixel resolution, etc.). Additionally or alternatively, the deck 310 or other components of the platform 300 can include a barcode reader to support operations associated with reading and tracking information with system components (e.g., disposables) and samples for traceability, as described in applications incorporated by reference below.

The sample processing elements can be supported in a co-planar manner by the deck 310, or alternatively at different planes. Preferably, discrete elements supported by the deck are non-overlapping, but alternative embodiments of the deck 310 can support the sample processing elements in an overlapping manner (e.g., for conservation of space, etc., for operational efficiency, etc.).

3.1.1 Deck-Supported Element: Reagent Cartridge

As shown in FIG. 9, the deck 310 includes at least one region for supporting a unit of the reagent cartridge 320, which functions to contain, in one or more compartments, materials for microbial cell capture and/or processing of samples according to one or more workflows for various applications. As such, the reagent cartridge 320 can define a set of storage volumes distributed across a set of domains, where the set of domains can be configured for providing suitable environments for the material contents of each domain. The set of storage volumes can directly contain sample processing materials, and/or can alternatively be configured to receive and maintain positions of individual containers (e.g., tubes, etc.) that contain sample processing materials. The storage volumes of each domain can be distributed in arrays, or otherwise arranged. While the reagent cartridge 320 is described as being supported by the deck 310, variations of the reagent cartridge 320 can alternatively be configured to operate independently of the deck 110. The reagent cartridge 120 can further additionally or alternatively include aspects described in U.S. application Ser. No. 16/867,235, filed 5 May 2020; U.S. application Ser. No. 16/867,256, filed 5 May 2020; U.S. application Ser. No. 16/816,817, filed 12 Mar. 2020; U.S. application Ser. No. 16/564,375 filed 9 Sep. 2019; U.S. application Ser. No. 16/115,370, filed 28 Aug. 2018; U.S. application Ser. No. 16/115,059 filed 28 Aug. 2018; U.S. application Ser. No. 16/048,104, filed 27 Jul. 2018; U.S. application Ser. No. 16/049,057, filed 30 Jul. 2018; U.S. application Ser. No. 15/720,194, filed 29 Sep. 2017; U.S. application Ser. No. 15/430,833, filed 13 Feb. 2017; U.S. application Ser. No. 15/821,329, filed 22 Nov. 2017; U.S. application Ser. No. 15/782,270, filed 12 Oct. 2017; U.S. application Ser. No. 16/049,240, filed 30 Jul. 2018; and U.S. application Ser. No. 15/815,532, filed 16 Nov. 2017; which are each incorporated in their entirety by this reference.

3.1.2 Deck-Supported Element: Tool Container

As shown in FIG. 9, the deck 310 includes at least one region for supporting a unit of the tool container 340, where the region functions to position the tool container 340 relative to fluid handling apparatus of the gantry 370 described below. The tool container 340 functions to contain, in one or more compartments, one or more units of various tools for fluid aspiration, fluid delivery, fluid spreading, separation of target material from non-target material of a sample and/or other tools, according to one or more workflows for various applications. As such, the tool container 340 can facilitate transfer and/or mixing of reagents with sample, fluidically couple and/or decouple elements at various regions of the deck 310, facilitate transfer or microwell plates/lids from one location to another, or otherwise interact with one or more components of the platform 300. While the tool container 340 is described as being supported by the deck 110, variations of the tool container 340 can alternatively be configured to operate independently of the deck 310. The tool container 340 can further additionally or alternatively include aspects described in U.S. application Ser. No. 16/867,235, filed 5 May 2020; U.S. application Ser. No. 16/867,256, filed 5 May 2020; U.S. application Ser. No. 16/816,817, filed 12 Mar. 2020; U.S. application Ser. No. 16/564,375 filed 9 Sep. 2019; U.S. application Ser. No. 16/115,370, filed 28 Aug. 2018; U.S. application Ser. No. 16/115,059 filed 28 Aug. 2018; U.S. application Ser. No. 16/048,104, filed 27 Jul. 2018; U.S. application Ser. No. 16/049,057, filed 30 Jul. 2018; U.S. application Ser. No. 15/720,194, filed 29 Sep. 2017; U.S. application Ser. No. 15/430,833, filed 13 Feb. 2017; U.S. application Ser. No. 15/821,329, filed 22 Nov. 2017; U.S. application Ser. No. 15/782,270, filed 12 Oct. 2017; U.S. application Ser. No. 16/049,240, filed 30 Jul. 2018; and U.S. application Ser. No. 15/815,532, filed 16 Nov. 2017; which are each incorporated in their entirety by reference, as above.

3.1.4 Heating and/or Cooling Subsystem

The deck 310 can additionally or alternatively include or support a heating and cooling subsystem 350, which functions to transfer heat to and/or from desired regions of substrates (e.g., base substrate 110, cover substrate 210), reagent cartridges 320, tool containers 340, and/or other components. The heating and cooling subsystem 350 can additionally or alternatively function to maintain desired temperatures within internal volumes of the platform 300. In variations, the heating and cooling subsystem 350 can include one or more units of: heating elements (e.g., Peltier heating elements, resistive heating elements, other heating elements), cooling elements (e.g., Peltier cooling elements, chilled aluminum block, fluidic pathway system to circulate coolant, etc.), thermal contact or non-contact bodies for transferring heat to or from the heating and cooling elements to other objects, heat sinks, fans, temperature sensors, and thermal control circuitry (e.g., with electrical coupling to processing elements of the base 180 described in more detail below). In variations, the cooling element(s) can maintain storage volumes and/or samples between 2 and 8 degrees Celsius, further preferably at 4 degrees Celsius. Additionally or alternatively, the cooling elements can maintain one or more storage volumes/samples at any suitable temperature (e.g. below 2 degrees Celsius, above 8 degrees Celsius, etc.).

One or more portions of the heating and cooling subsystem 350 can pass into openings of the deck 310 to thermally interface with or otherwise couple with desired portions of other system elements supported by the deck 310, in order to provide heat transfer functions for various applications. Alternatively, the deck 310 can be composed of a thermally conductive material at desired regions for heat transfer applications, and portions of the heating and cooling subsystem 350 can be configured to contact the thermally conductive material regions of the deck 310 for heat transfer.

In variations, the heating and cooling subsystem 350 can include a set of thermal bodies (e.g., which can be coupled to heat sink elements, in order to provide greater surface area for heat transfer. Furthermore, areas between the deck 310 and other volumes of the platform 300 can include one or more fans and/or ducts, in order to provide thermal mechanisms for convective heat transfer away from the set of thermal bodies and/or other system components as needed. Furthermore, in variations described above, one or more portions of the heating and cooling subsystem 350 (e.g., thermal bodies, etc.) can include features that facilitate retention of corresponding cartridges (e.g., reagent cartridges, substrates, etc.) in position.

In variations, one or more of the thermal bodies and/or other portions of the heating and cooling subsystem 350 can be coupled to actuators that move the thermal bodies into and out of thermal communication with elements supported by the deck 310; however, variations of the system 100 can omit actuators of the heating and cooling subsystem 350.

The heating and cooling subsystem 350 can additionally or alternatively include aspects described in U.S. application Ser. No. 16/867,235, filed 5 May 2020; U.S. application Ser. No. 16/867,256, filed 5 May 2020; U.S. application Ser. No. 16/816,817, filed 12 Mar. 2020; U.S. application Ser. No. 16/564,375 filed 9 Sep. 2019; U.S. application Ser. No. 16/115,370, filed 28 Aug. 2018; U.S. application Ser. No.

16/115,059 filed 28 Aug. 2018; U.S. application Ser. No. 16/048,104, filed 27 Jul. 2018; U.S. application Ser. No. 16/049,057, filed 30 Jul. 2018; U.S. application Ser. No. 15/720,194, filed 29 Sep. 2017; U.S. application Ser. No. 15/430,833, filed 13 Feb. 2017; U.S. application Ser. No. 15/821,329, filed 22 Nov. 2017; U.S. application Ser. No. 15/782,270, filed 12 Oct. 2017; U.S. application Ser. No. 16/049,240, filed 30 Jul. 2018; and U.S. application Ser. No. 15/815,532, filed 16 Nov. 2017; which are each incorporated in their entirety by reference, as above.

3.1.4 Gantry

As shown in FIG. 9, the platform 100 can include a gantry 370 coupled to the deck 110, which functions to support and/or enable actuation of one or more tools for various interactions with elements of the deck 110, along a set of axes. In variations, the gantry 370 provides one or more rails/tracks for moving tools, such as a pipettor 374 with pipette interface and/or gripping tool 375 (e.g., for gripping microwell assembly portions and/or other tools, etc.), in three-dimensional space (e.g., a three dimensional volume bound by the first side of the deck 310). In variations, tools actuated using the gantry 370 can be moved relative to the sample handling disposables, reagent cartridge 320 units, the tool container 340, or other elements, for transfer of materials across different components supported by the deck 310. Additionally or alternatively, tools supported by the gantry 370 can be used for imaging and/or reading of barcodes associated with various disposables supported by the deck 310 (e.g., in relation to identifying proper setup of a run, in relation to inventory management, etc.). For instance, as shown in FIG. 9, the gantry 370 can support or be coupled to a camera 376 (e.g., fluorescence imaging camera, bright-field imaging camera, etc.) for sample reading. Additionally or alternatively, the camera 376 can be coupled to another part of the platform 300 (e.g., based on direction of imaging relative to surfaces of the microwell assembly 100 configured for optical detection of signals).

The gantry 370 preferably enables movement of one or more tools along one or more axes parallel to broad surfaces of the reagent cartridge 320, sample processing disposables (e.g., microwell assembly units), and tool container 340, and additionally along an axis perpendicular to the broad surfaces. The gantry 370 can additionally or alternatively enable movement along a subset of these directions or along any other suitable direction. In order to enable movement, the gantry 370 includes or is otherwise coupled to one or more motors (e.g., motors for each axis or direction of movement), one or more encoders for position identification in each axis or direction of movement, and/or one or more switches (e.g., optical switches for each axis) for control of the gantry 370 (e.g., where the switches are electrically coupled with control circuitry described in relation to the base 180 below).

As shown in FIG. 9, the gantry 370 can include and/or or be configured to interact with a pipettor 374, which functions to hold, move, and/or otherwise interact with any number of tips or other tools, such as those of the tool container 340 described above. In variations, the pipettor 374 assembly can include one or more of: a pump (e.g., displacement pump) for providing pressure differentials for delivery and aspiration of fluids, a pressure sensor for sensing pipetting pressure, a level sensor for sensing fluid level within the pipettor 374, a tip detector (e.g., to enable determination of presence or absence of a tip coupled to the pipettor 374), and a tip ejection motor coupled to a tip ejector for removing tips from the pipettor 374.

The gantry 370, pipettor 374, camera/imaging elements, and/or gripping elements can additionally or alternatively include aspects described in U.S. application Ser. No. 16/867,235, filed 5 May 2020; U.S. application Ser. No. 16/867,256, filed 5 May 2020; U.S. application Ser. No. 16/816,817, filed 12 Mar. 2020; U.S. application Ser. No. 16/564,375 filed 9 Sep. 2019; U.S. application Ser. No. 16/115,370, filed 28 Aug. 2018; U.S. application Ser. No. 16/115,059 filed 28 Aug. 2018; U.S. application Ser. No. 16/048,104, filed 27 Jul. 2018; U.S. application Ser. No. 16/049,057, filed 30 Jul. 2018; U.S. application Ser. No. 15/720,194, filed 29 Sep. 2017; U.S. application Ser. No. 15/430,833, filed 13 Feb. 2017; U.S. application Ser. No. 15/821,329, filed 22 Nov. 2017; U.S. application Ser. No. 15/782,270, filed 12 Oct. 2017; U.S. application Ser. No. 16/049,240, filed 30 Jul. 2018; and U.S. application Ser. No. 15/815,532, filed 16 Nov. 2017; which are each incorporated in their entirety by reference, as above.

3.1.5 Other Platform Elements

In some embodiments, the platform 300 can include or support other sample processing elements (e.g., to provide functionality for other portions of operations for determining food quality/food safety). In variations, the platform 300 can include or support gas composition modulators, with environmental control (e.g., for incubation and culture applications). Such subsystems can include one or more of: heating elements, cooling elements, temperature sensors, gas composition sensors, vents, gas inlets, gas outlets, valves, and other suitable elements for environmental control within the platform 300 or at devices distinct from the platform 300. In relation to environmental control, the platform 300 can thus include various enclosures and/or chambers within which sample environments can be controlled. The platform may regulate the O2 and/or CO2 concentration in the microwells. The platform may include elements that allow decontamination of the system in between sample runs, such as UV-light.

In variations, the platform 300 (e.g., at base 380) can support control and processing architecture for one or more system functions including: fluid delivery with respect to the pipettor 374 for sample processing; fluid level sensing (e.g., at the pipettor 374, at various storage volumes of the reagent cartridge 320, etc.); actuation of gripping modes for the gripping tool 375; thermocycling and/or other heating or cooling functions for the reagent cartridge 320 and/or microwell assembly 100; functions for control of the gantry 370; functions involving receiving sensor signals and returning outputs; functions involving receiving sensor signals and executing various actions; functions associated with system power management; functions associated with system status indication elements (e.g., lights, audio output devices, visual output devices, etc.); functions associated with system input devices (e.g., buttons, keyboards, keypads, mice, joysticks, switches, touch screens, etc.); functions associated with display devices; functions associated with system data storage devices; functions associated with system transmission devices (e.g., wired transmission devices, wireless transmission devices, etc.); and other suitable functions. In variations, the platform 300 can thus support an electronics subsystem (e.g. PCB, power source, communication module, encoder, etc.) associated with a processing architecture (e.g. onboard the system, separate from the system, etc.), or any other suitable component, where the processing architecture can include any or all of: processors (e.g. microprocessors), controllers (e.g. microcontrollers), memory, storage, software, firmware, or any other suitable component. Additionally, the processing subsystem can include a machine vision module, which functions to read tags, verify protocols, perform error detection (e.g. detect that reagents do not match an assigned protocol), or perform any other function.

Embodiments, variations, and examples of additional elements are further described in U.S. application Ser. No. 16/048,104, filed 27 Jul. 2018; U.S. application Ser. No. 16/049,057, filed 30 Jul. 2018; U.S. application Ser. No. 15/720,194, filed 29 Sep. 2017; U.S. application Ser. No. 15/430,833, filed 13 Feb. 2017; U.S. application Ser. No. 15/821,329, filed 22 Nov. 2017; U.S. application Ser. No. 15/782,270, filed 12 Oct. 2017; U.S. application Ser. No. 16/049,240, filed 30 Jul. 2018; U.S. application Ser. No. 15/815,532, filed 16 Nov. 2017; U.S. application Ser. No. 16/115,370, filed 28 Aug. 2018, U.S. application Ser. No. 16/564,375, filed 9 Sep. 2019, and U.S. application Ser. No. 16/816,817, filed 12 Mar. 2020, as incorporated by reference above.

4. METHODS AND APPLICATIONS OF USE

Figure 10A:
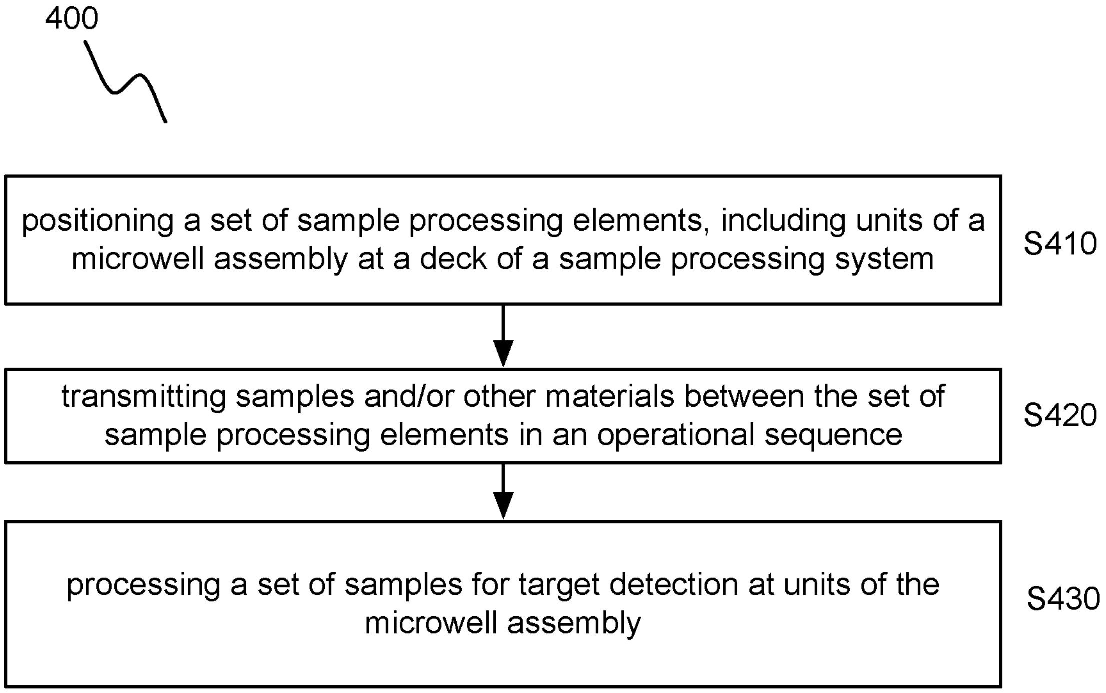
FIG. 10A depicts a flow chart of an embodiment of a method for target detection.

As shown in FIG. 10A, an embodiment of a method 400 for target detection and characterization can include: positioning a set of sample processing elements, including units of a microwell assembly at a deck of a sample processing system S410; transmitting samples and/or other materials between the set of sample processing elements in an operational sequence S420; and processing a set of samples for target detection at units of the microwell assembly S430. Additionally or alternatively, the method 400 can include any or all of the processes described in U.S. application Ser. No. 16/048,104, filed 27 Jul. 2018; U.S. application Ser. No. 16/049,057, filed 30 Jul. 2018; U.S. application Ser. No. 15/720,194, filed 29 Sep. 2017; U.S. application Ser. No. 15/430,833, filed 13 Feb. 2017; U.S. application Ser. No. 15/821,329, filed 22 Nov. 2017; U.S. application Ser. No. 15/782,270, filed 12 Oct. 2017; U.S. application Ser. No. 16/049,240, filed 30 Jul. 2018; U.S. application Ser. No. 15/815,532, filed 16 Nov. 2017; U.S. application Ser. No. 16/115,370, filed 28 Aug. 2018, U.S. application Ser. No. 16/564,375, filed 9 Sep. 2019, and U.S. application Ser. No. 16/816,817, filed 12 Mar. 2020, which are each incorporated in their entirety by this reference.

The method is preferably performed with an embodiment, variation, or example of the systems described above (e.g., in relation to transmission of content between various elements and/or sample processing), but can additionally or alternatively be performed with any other suitable system. The method 400 is further preferably at least partially automated (e.g., requires user to load reagents and select a protocol, requires no user intervention, etc.), but one or more portions can additionally or alternatively be manually performed (e.g., for quality control steps, for all protocols, for rare protocols, etc.).

Specific workflows associated with the method 400 and system elements described above are described in further detail below, where samples (e.g., samples derived from homogenized or non-homogenized consumables, etc.) can be processed according to the workflows.

Figure 10B:
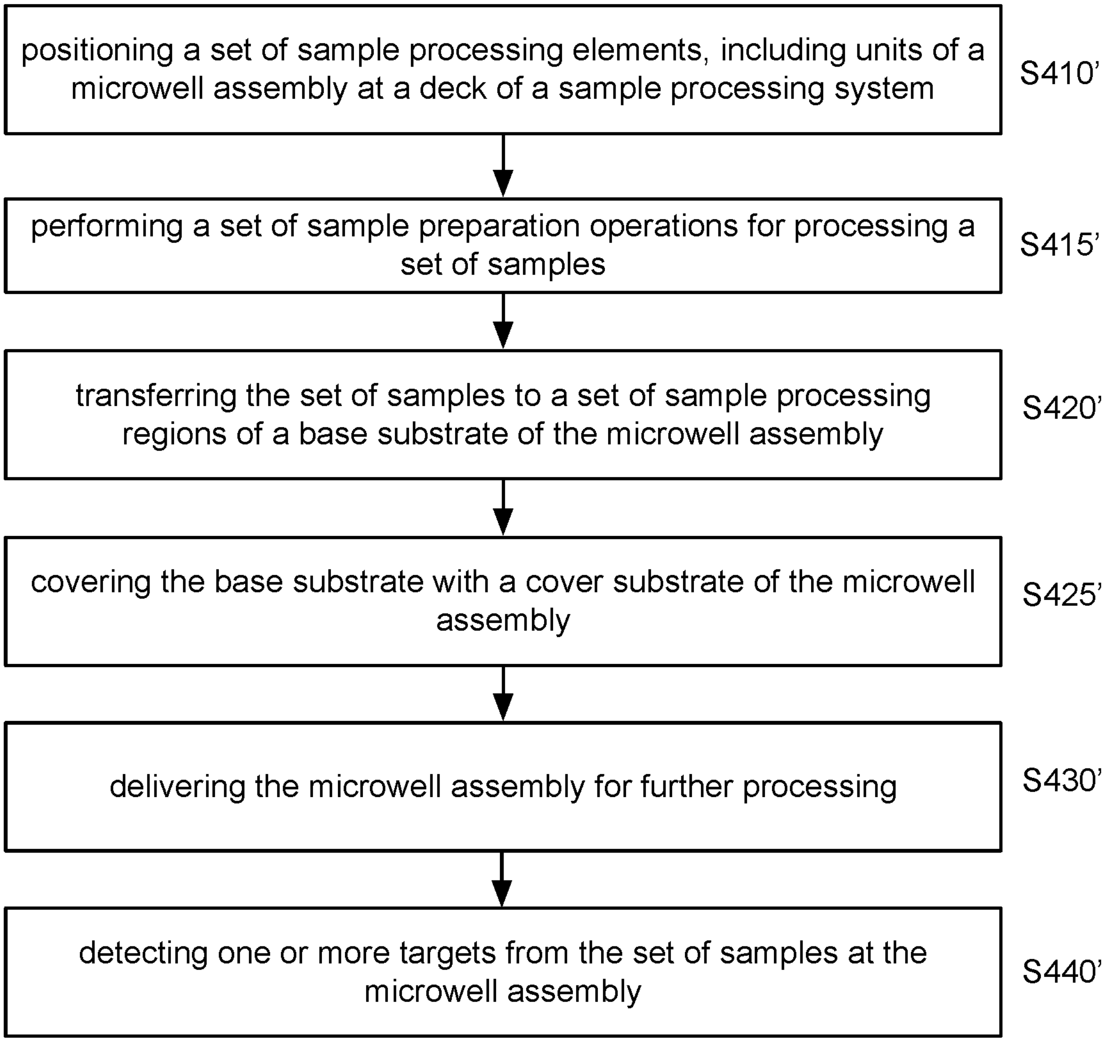
FIG. 10B depicts a flow chart of a variation of a method for target detection.

4.1 Method—Example Workflow for MPN Determination from Multiple Food Samples in Parallel As shown in FIG. 10B, a variation of the method 400 configured for processing one or more consumable samples (e.g., individual food sample suspensions) with the goal of evaluating safety and quality can include: positioning a set of sample processing elements, including units of a microwell assembly at a deck of a sample processing system S410'; performing a set of sample preparation operations for processing a set of samples S415'; transferring the set of samples to a set of sample processing regions of a base substrate of the microwell assembly S420' (e.g., using a pre-determined delivery of the samples in droplet-form across respective microwell surfaces associated with each sample, by way of capillary flow from one end of a sample processing region as enabled by spacing between the base substrate and cover substrate of the microwell assembly, etc.); covering the base substrate with a cover substrate of the microwell assembly S425' (e.g., to spread the sample fluids, to partition the sample fluids); delivering the microwell assembly for further processing S430'; and detecting one or more targets from the set of samples at the microwell assembly S440'.

The method 400 functions to implement systems for rapid sample testing, with specific applications in most probable number (MPN) determination. In particular, the method 400 can be used to process multiple samples in parallel, in relation to enabling rapid operation of serial dilution tests to measure the concentrations of target microorganisms in a food test portion (e.g., for food safety/food quality applications). During processing, the food test portion can then be diluted to prepare a food suspension (e.g., with combination with a specific broth/reagent to prepare a sample for analysis).

In embodiments, the system can position a set of sample processing elements, including units of a microwell assembly at a deck of a sample processing system S410', in preparation for processing samples in subsequent steps of the method 400. The system can configure, using the gantry described above and/or by manual actions by a system operator, the set of sample processing elements for downstream processing steps (e.g., as shown in FIG. 9). In other variations, Step S410' can configure sample processing elements in another suitable manner, for processing multiple samples in parallel. In preparing for downstream sample processing operations, Step S410' can include transitioning a base substrate of a unit of a microwell assembly to a liquid loading position of the platform, and reading, using a camera of the platform, a plate identifier. The system can then match the plate identifier with identifiers of samples for processing, in order to verify that the correct samples are being processed, and to affiliate any sample processing results with the run associated with the plate identifier. Step S410' can, however, include other run preparation steps in other variations.

Step S415' recites: performing a set of sample preparation operations for processing a set of samples. Step S415' functions to process sample material derived from consumables (e.g., food samples, drink samples, etc.) such that they can be distributed into the set of sample processing regions of the base substrate of the microwell assembly. In variations, step S415' can include one or more of: homogenizing food test portions (e.g., mechanically, chemically, etc.) with a diluent (e.g., with a suitable dilution factor); suspending samples (e.g., with buffered peptone water, with other suspension agents); mixing a volume (e.g., less than 1 mL, greater than or equal to 1 mL) of each sample being processed with media (e.g., culture media that inhibits background flora and promotes the growth of specific microorganisms, media to produce a suitable dilution factor, such as a 1:1 dilution factor, etc.), revelation chemistry including enzymatic substrates (e.g., fluorometric substrates, chromogenic substrates, etc.), or other processing materials in dry or liquid form (e.g., to generate samples that have suitable viscosity characteristics and/or total volume for handling and fluid delivery, to process samples that have higher inhibitory characteristics, such as spices, chocolate, food matrices that are colored/autofluorescent, or other consumables); filtering samples (e.g., to remove particulates that may affect loading of samples at microwells, distribution of samples uniformly across microwells having different characteristic dimensions, clogging, detection, etc.), where limiting particulate sizes can be covered based upon pitch between adjacent microwells (e.g., with filter sizes between 20 and 280 microns, with other filter sizes); and any other suitable sample preparation step. Step S415' can be performed using the fluid handling elements of the platform described in Section 3 above, or using other suitable apparatus components.

In variations, sample processing steps of Block S415' can be used to generate MPN estimations with a lower detection limit of at least 10 cfu/g, a higher detection limit of 1,000,000 cfu/g, or other suitable detection limits (e.g., in relation to volumetric measurements such as cfu/mL).

Step S420' recites: transferring the set of samples to a set of sample processing regions of a base substrate of the microwell assembly (e.g., using a pre-determined delivery of the samples in droplet-form across respective microwell surfaces associated with each sample, by way of capillary flow from one end of a sample processing region as enabled by spacing between the base substrate and cover substrate of the microwell assembly, etc.). Step S420' can be performed using the fluid handling elements of the platform described in Section 3 above, or using other suitable apparatus. In variations, each of the set of samples being processed can be transferred to be received at the sample processing regions of the base substrate in sequence. Alternatively, the set of samples can be dispensed into the sample processing regions of the base substrate simultaneously (e.g., using a multi-head fluid dispensing apparatus, using other apparatus). In particular, transferring the set of samples to a set of sample processing regions of a base substrate of the microwell assembly in step S420' automatically partitions the set of samples, using embodiments, variations, and examples of the set of microwell subarrays arranged in a gradient, for rapid sample testing (e.g., MPN determination).

Step S425' recites: covering the base substrate with a cover substrate of the microwell assembly, which functions to protect and facilitate maintenance of a proper environment for the set of samples during downstream processing and incubation steps. In variations, Step S425' can be performed using the elements (e.g., modified gripping elements) coupled to the gantry of the platform described in Section 3 above, or using other suitable apparatus. In variations, as described in Section 2 above, the cover substrate can include venting channels and/or be composed of a porous material, such that Step S425' functions to prevent sample cross contamination, prevent evaporation of sample, and allow gas exchange between samples and the environment during incubation/culture. Additionally or alternatively, as described in FIG. 5 above, elastomeric properties of the cover substrate can be used in Step S425' to provide pockets (e.g., air pockets) above each of the set of samples during processing to further prevent sample cross-talk. Step S425' can, however, be implemented in another suitable manner.

Step S430' recites: delivering the microwell assembly for further processing, which functions to stage the microwell assembly, with the set of samples, for incubation, culture, or other processing steps. Step S430' can be performed using the elements (e.g., gripping elements) coupled to the gantry of the platform described in Section 3 above, or using other suitable apparatus. In variations, the system can transport the microwell assembly to a position of the platform, where an operator can then transfer the microwell assembly to other apparatuses for incubation, culture, or further processing steps. Alternatively, the system can transport the microwell assembly to a position of the platform whereby incubation, culture, or further processing steps can be automatically performed. In transporting the microwell assembly, the system preferably operates in a manner (e.g., using gantry and tools) that provides minimal physical disturbance of samples of the set of microwells; however, Step S430' can alternatively be implemented in another suitable manner.

Step S440' recites: detecting one or more targets from the set of samples at the microwell assembly. Block S440' can be performed after a suitable incubation period (e.g., 24 hours, less than 24 hours, greater than 24 hours). Step S440' can be performed using the camera elements (e.g., fluorescence imaging elements, brightfield imaging elements) coupled to the gantry and/or base of the platform described in Section 3 above, or using other suitable apparatus. For instance, a separate reader subsystem can be implemented for operations that are conducted outside of the platform (e.g., in the context of incubation). Outputs of Step S440' can include values, with confidence limits, for MPN estimations for each sample. In more detail, computing components in communication with the imaging subsystem can implement algorithms for processing microwells of each microwell subarray from which signals (e.g., fluorometric signals, colorimetric signals, etc.) are detected, and returning analyses indicating MPN or other statistics associated with quality and safety for each of the set of samples. Detection can be based upon fluorescence and/or other optically-detected signals (e.g., based upon enzyme substrates attached to a fluorophore, based upon fluorescent or colorimetric pH indicators), where multiple and/or different fluorophores can be used depending upon intended targets for detection.

In variations of step S440', the system can process images of the microwell assembly, post sample processing and incubation, with one or more transformation algorithms (e.g., Hough transforms, filtering operations, fitting operations, microwell-recognition operations, registration operations, etc.) for detection of fluorescent/colorimetric signals and associated characteristics (e.g., intensity), and/or perform other suitable image processing operations. The system can then generate analyses based upon on one or more of: tabulated references, estimation algorithms (e.g., Thomas' Rule), confidence limit determination methods (e.g., Haldane's method, etc.), bound approximation approaches (e.g., Blodgett method, etc.), particle counting statistical methods (e.g., Poisson statistics-mediated particle/cell counting methods applied to microwell arrays), applying error corrections associated with partitioning error and/or subsampling error, implementing virtual partitions, or other suitable methods. Additionally or alternatively, once a threshold detection limit is reached, the plate can be sealed closed to prevent any further interaction with and/or contamination of the environment.

In variations of the method 400, medium composition, substrate, incubation conditions, and detection systems are dependent upon the target(s) intended for detection from the set of samples. For instance, for detecting total viable count, an example medium base can include plate count agar (e.g., non-selective plate count agar), with a medium composition of tryptone, yeast extract, and glucose, a principle of detection based upon substrate targeting general enzymatic activity or viability, and an incubation time of less than 72 hours at 30 C. For detecting Enterobacteriaceae, an example medium base can include violet red bile glucose (e.g., selective violet red bile glucose), with a medium composition of peptone, yeast extract, glucose, cristal violet, sodium, bile salt/sodium deoxycholate, a principle of detection based upon pH indication, and an incubation time of less than 24 hours at 30 C. For detecting Coliforms, an example medium base can include violet red bile lactose (e.g., selective violet red bile lactose), with a medium composition of peptone, yeast extract, lactose, cristal violet, sodium, bile salt/sodium deoxycholate, a principle of detection based upon pH indication, and an incubation time of less than 24 hours at 37 C. Relatedly, for detection based on β-galactosidase enzyme substrate, a medium used should not contain lactose, in order to avoid acidification of the medium (and then the inhibition of fluorescence). In such embodiments, a Rapid'*E. coli* medium could be considered (e.g., a medium comprising Peptones, yeast extract, sodium chloride, bile salt/sodium deoxycholate+β-galactosidase enzyme substrate). For detecting *E. coli*, an example medium base can include tryptone bile X-glucuronide (e.g., selective tryptone bile X-glucuronide), with a medium composition of peptone/tryptone, yeast extract, bile salt/sodium deoxycholate, a principle of detection based upon a substrate that interacts with beta-glucuronidase enzymes, and an incubation time of less than 24 hours at 44 C. For detecting yeasts and molds, an example medium base can include YGC medium, with a medium composition of yeast extract, glucose, chloramphenicol, a principle of detection based on several non-specific enzymatic activities and an incubation time of less than 72 hours at 30° C. The system could also allow to perform *E. coli*/Coliforms multi-target detection. However, other medium compositions, substrates, incubation conditions, and detection systems can be used depending upon intended target(s).

The system embodiment(s) can, however, be configured to implement other workflows including variations of those described, and/or other workflows.

4.1.1 Method—MPN Enumeration

In relation to the method 400 described above and/or other related methods, MPN principles and procedures can be applied as follows:

Principle: Test portions of a sample processed according to embodiments, variations, and/or examples described above can be inoculated into a medium (e.g., liquid medium, dry medium, re-hydrated dry medium, etc.) that is designed to support the growth of a particular microorganism or a group of microorganisms, and/or inhibits proliferation of non-target microorganisms. To determine whether growth of the target microorganism(s) has occurred, various criteria can be used (e.g., visual detection of turbidity, gas production, color changes, subsequent isolation of the microorganisms on a selective agar medium, other mechanisms, etc.). The composition of the growth medium and the criteria for discriminating between a positive and a negative result are described further below. Using these approach, only a qualitative value can be attributed to each test portion (i.e. the result is either positive or negative. To obtain an estimate of the quantity of microorganisms that is present, it is necessary to examine several test portions and use statistical procedures to determine the most probable number (MPN).

Inoculation Procedure: If a selective growth medium is used, the addition of the test portion should not reduce its selective properties, thereby allowing the growth of non-target microorganisms. In most standards, information about the compatibility of a specific matrix and the liquid medium is described, but care should be taken with some matrices that may contain growth-inhibiting substances (e.g., spices, cocoa, bouillon, etc.). If such matrices are involved, methods for processing samples and matrices with neutralizing compounds, using higher dilution factors, centrifugation, buoyancy-based separation (e.g., with coupling of target sample material to buoyant particles and washing of non-target matrix material), filtration, immunomagnetic separation to separate the target microorganisms from the matrix, and/or other mechanisms to mitigate effects of problematic matrices can be implemented. In the event incompatibility is due to the biological composition of the matrix (e.g., as in heavily contaminated environmental samples, fermented products, products with probiotic bacteria, etc.), methods can further implement spiking-based experiments and/or generation of suitable controls.

In examples, small volume test portions (e.g., of less than 1 milliliter, equal to 1 milliliter, etc.) can be added to a volume (e.g., five to ten times the volume) of single-strength media. In examples, intermediate volume test portions (e.g., between 1 milliliter and 100 milliliter) can be added to a volume (e.g., equal volumes) of higher strength (e.g., double-strength) media. In examples, large volume test portions (e.g., greater than 100 milliliters) can be combined with more concentrated media. For special purposes, as described in system and platform embodiments above, sterile dehydrated media can be dissolved in sample (e.g., in cold or pre-warmed sample) to be analyzed. In examples, the time difference between preparing the first dilution of a sample and inoculation of the last portion should be below a threshold time (e.g., 15 minutes, another suitable time), with sterile procedures implemented. Inoculated partitions are then incubated for a suitable duration and/or temperature of incubation (e.g., depending upon target microorganisms involved). For some target microorganisms, a multi-stage incubation procedure and/or a confirmation step may be implemented. The criteria that distinguish positive from negative results can vary with each microorganism or group of microorganisms. Using these criteria, the MPN determination method then involves counting the number of positive results obtained with all the test portions derived from one sample.

Inoculation System Selection: According to MPN methods described, a sample is diluted, across multiple partitions, to such a degree that inocula will sometimes but not always contain viable microorganisms of interest. The "outcome" (i.e. the number of inocula producing growth at each dilution) will thus give an estimate of the initial concentration of the microorganism(s) in the sample. In order to obtain estimates over a broad range of possible concentrations, serial dilutions and/or incubation over several partitions (e.g., tubes, wells of a plate, microwell system described above, droplets of an emulsion, etc.) can be used. Then, the estimated MPN of microorganisms present in the original sample, and the precision of the estimate, can be calculated by statistical procedures on the basis of the numbers of positive and negative partitions at one or more dilutions observed after incubation. The MPN inoculation system can be selected based upon one or more of: the expected number of microorganisms in the sample under investigation, regulatory requirements, precision required, and any other practical considerations. The measurement uncertainty depends on the number of positive test portions observed and increases as a function of the square root of the number of partitions used. The number of tubes has to be quadrupled to halve the measurement uncertainty. When systems having only a few replicate partitions are used, the measurement uncertainty is low.

Inoculation System Variation—Single Dilution System: When the expected concentration of microorganisms is small or expected to vary only moderately, an appropriate inoculation system is a single series of equal test portions. Where the expected ratio between the maximum and minimum number of microorganisms is less than ~25, ten parallel test portions is the smallest number expected to function, and with 50 parallel partitions, a ratio of 200 is the limit.

Inoculation System Variation—Multiple Dilution System: When the concentration of microorganisms in the sample is unknown, or if great variation is anticipated, an appropriate inoculation system is a multiple dilution system where a series of partitions from several dilutions is implemented. Such a platform inoculates a sufficient number of dilutions to ensure a system with both positive and negative results. The number of dilutions also depends on the calculation method used for estimating the MPN value (e.g., depending upon theoretical models, depending upon reference tables, etc.).

Inoculation System Variation—Symmetric Dilution System: A symmetric MPN system can use three or five parallel•partitions (or another suitable number of partitions) per dilution. The precision obtained with this system declines rapidly with lower numbers of tubes per dilution. If more precision is required, it is recommended that five or more partitions are chosen.

Inoculation System Variation—Non-Symmetric Dilution System: In non-symmetric systems, the different dilution levels do not have the same number of tubes. Such a configuration can be appropriate to estimate numbers of microorganisms within a well-defined range (examples of which are described in ISO 8199).

Determination of MPN Values: In variations, the MPN value can be determined by one or more of: calculation with mathematical formulas, consultation of MPN tables, and utilization of other algorithms. These three methods are detailed below:

Determination of MPN Values—Mathematical Formulas: The approximate MPN values for any number of dilutions and parallel tubes can be derived by application of the following equation, where $Z_p$ is the number of positive partitions; $m_r$ is the sample reference mass (e.g., in grams), $m_s$ is the total mass (e.g., in grams) of sample in all partitions with negative reactions, and $m_t$ is the total mass (e.g., in grams) of sample in all partitions.

$$MPN = \frac{Z_p \times m_f}{\sqrt{m_s \times m_t}}$$

The MPN value for a single series of partitions is derived from the formula, where $m_r$ is the sample reference mass (e.g., in grams), $m_m$ is the mass (e.g., in grams) of sample in each partition of the series, ln is the natural logarithm, n is the number of partitions in the series, and $z_p$ is the number of partitions with a positive reaction.

$$MPN = \frac{m_r}{m_m} \ln\left[\frac{n}{n - z_p}\right]$$

The 95% confidence limits of the MPN estimate can be calculated approximately using the equation, where x is the upper or lower 95% confidence limit, $m_r$ is the sample reference mass (e.g., in grams), $m_m$ is the mass (e.g., in grams) of sample in each partition of the series, ln is the natural logarithm, n is the number of partitions in the series, and $z_n$ is the number of partitions with a negative reaction:

$$x = \frac{m_r}{m_m} \ln\left[\frac{n}{z_n \pm 2\sqrt{\frac{z(n - z_n)}{n}}}\right]$$

The $\log_{10}$ standard uncertainty of a symmetrical multiple-dilution MPN system can be obtained from the following equation, where SE is the standard error of $\log_{10}$ MPN, f is the dilution factor between consecutive dilutions, and n is the number of partitions per dilution.

$$SE = 0.58\sqrt{\frac{\log_{10} f}{n}}$$

Variations of the formulas above can be adapted for volumetric parameters, where masses can be extracted from associated volumes, and/or formulas can be adapted to account for volume.

Determination of MPN Values—Tables: To express the outcome per sample reference mass (or volume for liquid samples), table values can be processed (e.g., by multiplying the MPN and the 95% limit values by a ratio such as [reference mass]/[test portion mass]). With symmetrical systems, the method can include implementation of a number of successive dilutions (e.g., three successive dilutions) with a suitable number of replicates, embodiments, variations, and examples of which are described above for supporting system components. Using these methods, the number of positive results for each set of partitions can be obtained (e.g., using platform 300 described above) and, from the MPN table for the inoculation system used, the MPN value(s) of associated microorganisms present in the reference volume of the sample can be obtained. Various combinations of positive partitions can be more likely than others statistically, so combinations of positive partition results can be attributed to various categories (e.g., a result with higher probability, a result with medium probability, a result with low probability, etc.).

Determination of MPN Values—Algorithms: In variations of the methods described, various algorithms can be implemented (e.g., executed using MPN Assay Analyzer, using another suitable system).

Additionally or alternatively, methods can be adapted from those described in Appendix A and/or U.S. patent application Ser. No. 16/072,712 titled "Digital Microbiology" and filed on 25 Jan. 2016, which are each herein incorporated in its entirety by this reference.

5. CONCLUSION

The FIGURES illustrate the architecture, functionality and operation of possible implementations of systems, methods and computer program products according to preferred embodiments, example configurations, and variations thereof. In this regard, each block in the flowchart or block diagrams may represent a module, segment, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

What is claimed is:

1. A system for most probable number (MPN) determination, the system comprising:

a base substrate;

a set of sample processing regions defined at a broad surface of the substrate, wherein each of the set of sample processing regions comprises:

a set of microwell subarrays arranged in a gradient between an upstream end and a downstream end of each respective sample processing region, and a boundary separating each respective sample processing region from adjacent sample processing regions; and a cover substrate configured to mate with the base substrate in a coupled mode, the cover substrate comprising a network of venting channels aligned with the set of sample processing regions upon mating the base substrate with the cover substrate in the coupled mode, the network of venting channels providing gas exchange between the base substrate and an environment surrounding the set of sample processing regions, wherein the cover substrate is composed of a material having a level of porosity that permits gas exchange between contents of the system and an environment of the system, while preventing liquid exchange.

2. The system of claim 1, wherein the set of microwell subarrays has an initial microwell subarray with wells having a first characteristic dimension positioned at the upstream end, and a terminal microwell subarray with wells having a second characteristic dimension positioned at the downstream end.

3. The system of claim 2, wherein the first characteristic dimension is smaller than the second characteristic dimension, wherein the initial microwell subarray occupies a first footprint of the base substrate, and wherein the terminal microwell subarray occupies a second footprint of the base substrate larger than the first footprint.

4. The system of claim 2, wherein wells of the initial subarray are arranged in a first packed configuration, and wherein wells of the terminal subarray are arranged in a second packed configuration.

5. The system of claim 1, wherein the base substrate is composed of a material having a level of porosity that permits gas exchange between contents of wells of the set of sample processing regions and an environment of the system, while preventing liquid exchange.

6. The system of claim 1, wherein the set of sample processing regions contains dried sample processing materials comprising at least one of: media, fluorometric substrates, and colorimetric substrates.

7. The system of claim 1, wherein each sample processing region provides an aggregate volumetric capacity from 0.01 to 10 milliliters and wherein each of the set of microwell subarrays comprises between 10 and 100,000 partitions, corresponding to a most probable number (MPN) range from 5 to 3,000,000 for a MPN assay.

8. The system of claim 1, wherein the boundary comprises a recessed channel operable to receive sample overflow.

9. The system of claim 1, wherein the cover substrate is composed of an elastomeric material providing: a deformed operation mode in which a sub-volume of fluid is displaced from samples distributed to the set of sample processing regions at the base substrate, and a relaxed operation mode in which the cover substrate relaxes to a baseline state to create pockets between the cover substrate and microwells of the base substrate.

10. The system of claim 1, wherein the network of venting channels comprises a first subset of channels spanning the cover substrate parallel to a first axis, and a second subset of channels spanning the cover substrate parallel to a second axis, such that the first subset of channels crosses the second subset of channels.

11. The system of claim 1, wherein the network of venting channels is open to an environment of the system at peripheral edges of the cover substrate.

12. The system of claim 1, wherein the cover substrate comprises a first locking portion complementary to a second locking portion of the base substrate.

13. The system of claim 1, wherein the cover substrate is separated from the base substrate by one or more functional layers.

14. The system of claim 13, wherein the one or more functional layers comprises a porous adhesive film layer positioned between the cover substrate and the base substrate and providing gas exchange from wells of the set of sample processing regions.

15. A system for most probable number (MPN) determination, the system comprising:

a base substrate;

a set of sample processing regions defined at a broad surface of the substrate, wherein each of the set of sample processing regions includes:

a set of microwell subarrays arranged in a gradient between an upstream end and a downstream end of each respective sample processing region, and a boundary separating each respective sample processing region from adjacent sample processing regions; and a cover substrate configured to mate with the base substrate in a coupled mode, the cover substrate comprising a network of venting channels aligned with the set of sample processing regions upon mating the base substrate with the cover substrate in the coupled mode, the network of venting channels providing gas exchange between the base substrate and an environment surrounding the set of microwell subarrays, wherein the cover substrate is composed of a material having a level of porosity that permits gas exchange between contents of the system and an environment of the system, while preventing liquid exchange.

16. The system of claim 15, wherein the set of microwell subarrays has an initial microwell subarray with wells having a first characteristic dimension positioned at the upstream end, and a terminal microwell subarray with wells having a second characteristic dimension positioned at the downstream end, wherein the first characteristic dimension is smaller than the second characteristic dimension.

17. The system of claim 15, wherein at least one of the base substrate and the cover substrate is composed of a material having a level of porosity that permits gas exchange between contents of wells of the set of sample processing regions and an environment of the system, while preventing liquid exchange.

18. The system of claim 15, wherein the cover substrate is composed of an elastomeric material providing: a deformed operation mode in which a sub-volume of fluid is displaced from samples distributed to the set of sample processing regions at the base substrate, and a relaxed operation mode in which the cover substrate relaxes to a baseline state to create pockets between the cover substrate and microwells of the base substrate.

* * * * *